United States Patent [19]
Rimondi et al.

[11] Patent Number: 5,313,766
[45] Date of Patent: * May 24, 1994

[54] METHOD AND APPARATUS FOR ON DEMAND MANUFACTURING OF CUSTOM-SIZED BAGS CONFORMING TO THE VOLUME OF ARTICLES RECEIVED THEREIN AT A CHECK-OUT COUNTER

[75] Inventors: Renato Rimondi, Bologna; Angelo Cappi, Moderna, both of Italy

[73] Assignee: Awax S.R.L., Vignola, Italy

[ * ] Notice: The portion of the term of this patent subsequent to Mar. 20, 2007 has been disclaimed.

[21] Appl. No.: 5,864

[22] Filed: Jan. 13, 1993

Related U.S. Application Data

[63] Continuation of Ser. No. 851,234, Mar. 13, 1992, abandoned, which is a continuation of Ser. No. 703,595, May 20, 1991, abandoned, which is a continuation of Ser. No. 568,544, Aug. 15, 1990, abandoned, which is a continuation of Ser. No. 90,964, Aug. 28, 1987, abandoned.

[30] Foreign Application Priority Data

Feb. 23, 1987 [IT] Italy .............................. 19462 A/87

[51] Int. Cl.⁵ .......................... B65B 9/08; B65B 9/20; B65B 5/08; B65B 59/02
[52] U.S. Cl. ...................................... 53/451; 53/474; 53/66; 53/75; 53/245; 53/551; 53/390
[58] Field of Search .................. 53/412, 413, 451, 459, 53/133.8, 134.1, 551, 390, 567, 504, 66, 75, 474, 245

[56] References Cited

U.S. PATENT DOCUMENTS

| | | | |
|---|---|---|---|
| 3,740,922 | 6/1973 | Liou | 53/390 X |
| 3,792,565 | 2/1974 | Goransson | 53/390 X |
| 3,815,313 | 6/1974 | Heisler | 53/413 |
| 3,834,525 | 9/1974 | Morgese et al. | 53/134.1 X |
| 4,407,108 | 10/1983 | Craig | 53/551 X |
| 4,578,931 | 4/1986 | Roovers | 53/551 |
| 4,718,217 | 1/1988 | Ross | 53/504 |
| 4,729,210 | 3/1988 | Galliano | 53/551 X |
| 4,909,356 | 3/1990 | Rimondi et al. | 53/390 X |

Primary Examiner—Horace M. Culver
Attorney, Agent, or Firm—Cohen, Pontani, Lieberman, Pavane

[57] ABSTRACT

Bags custom-sized to the volume of articles packed and to be packed therein are manufactured on-site and on-demand at the location at which the articles are packed in the bags. The bags are formed from a continuous sheet of flexible film material which is shaped into a tubular wrapper along the interior of a generally quadrangular former. The bags are sealed along their tops so as to prevent inadvertent spillage of articles therefrom and may incorporate unitary handles formed during manufacture of the bags and a readily removable protective envelope at least partly defining the top closure thereof.

39 Claims, 22 Drawing Sheets

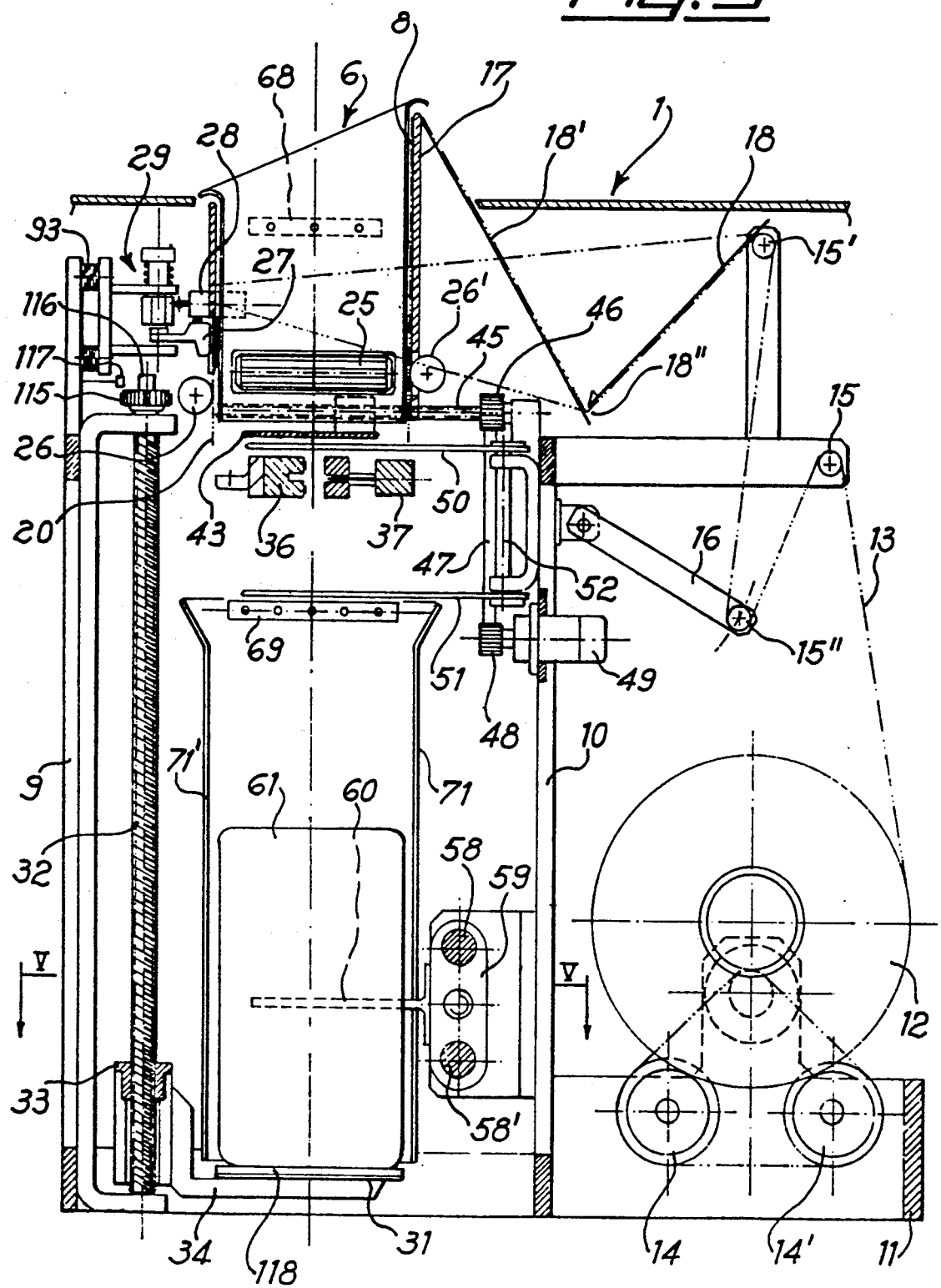

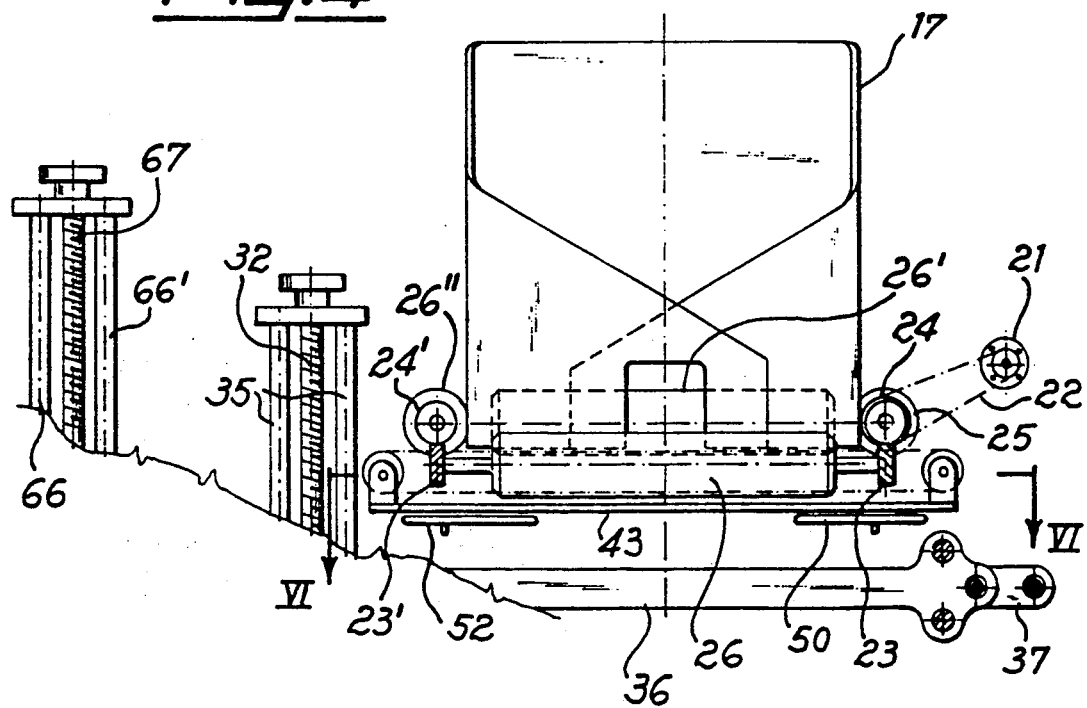
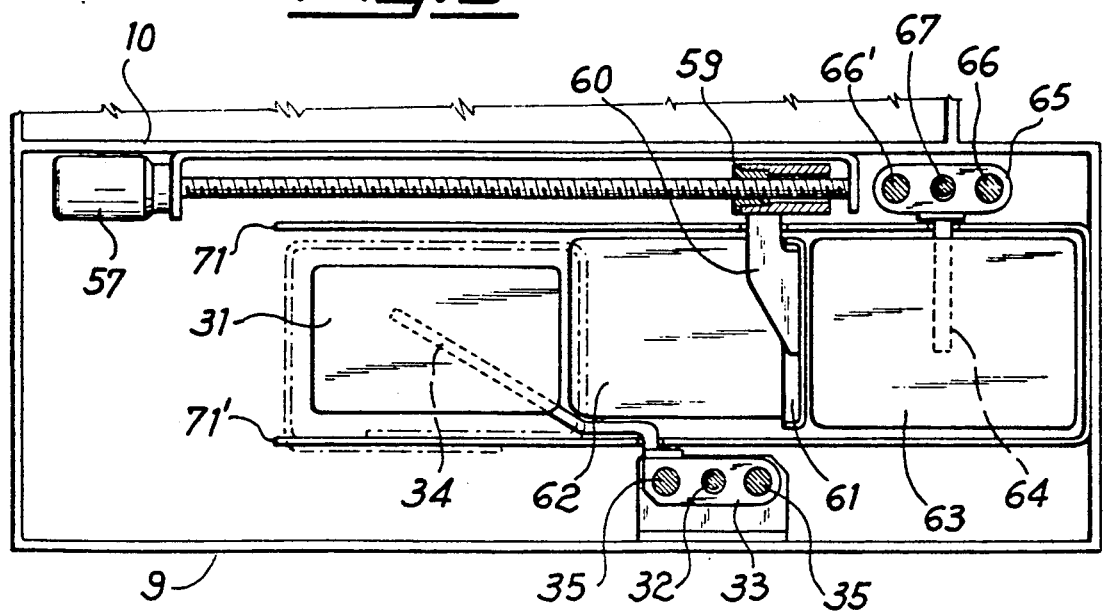

Fig.13
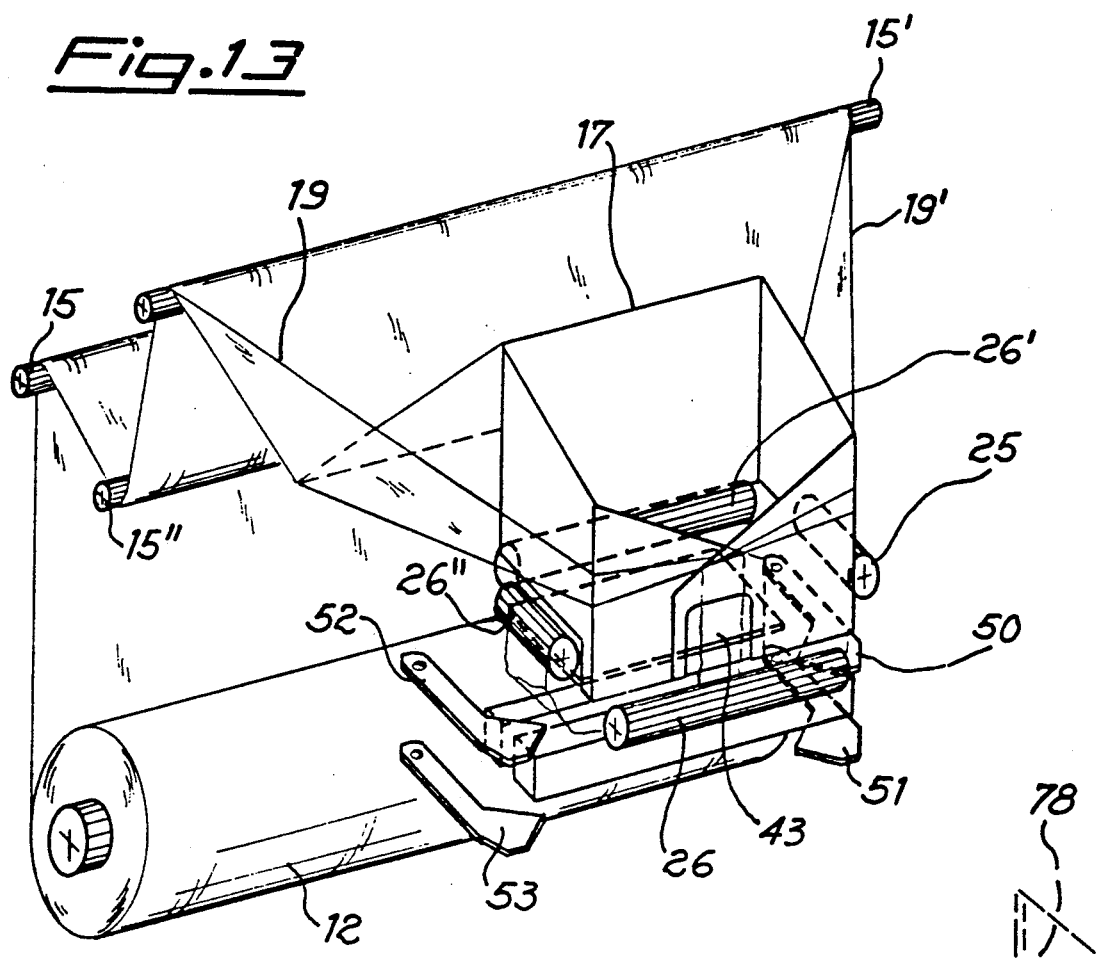
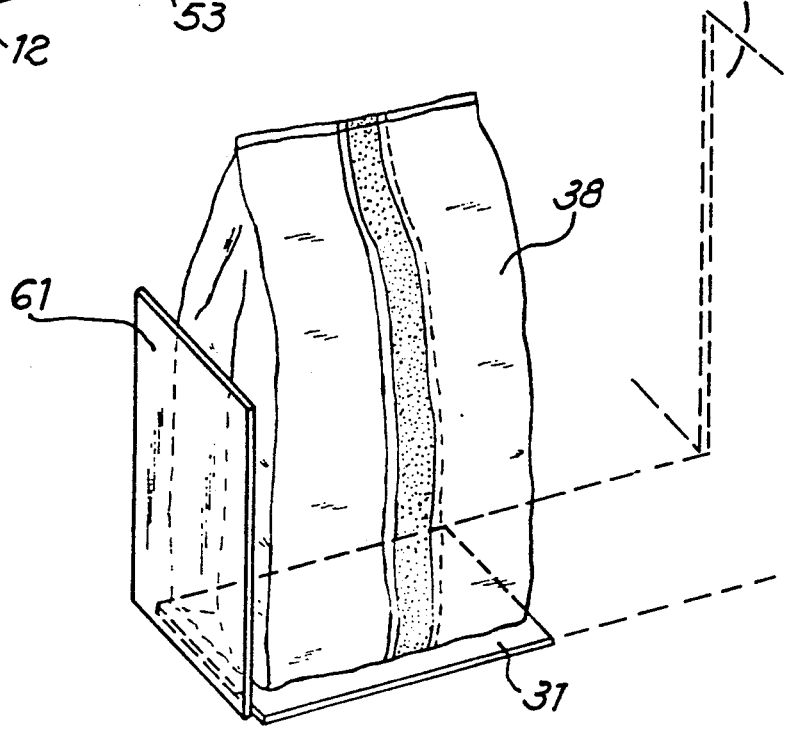

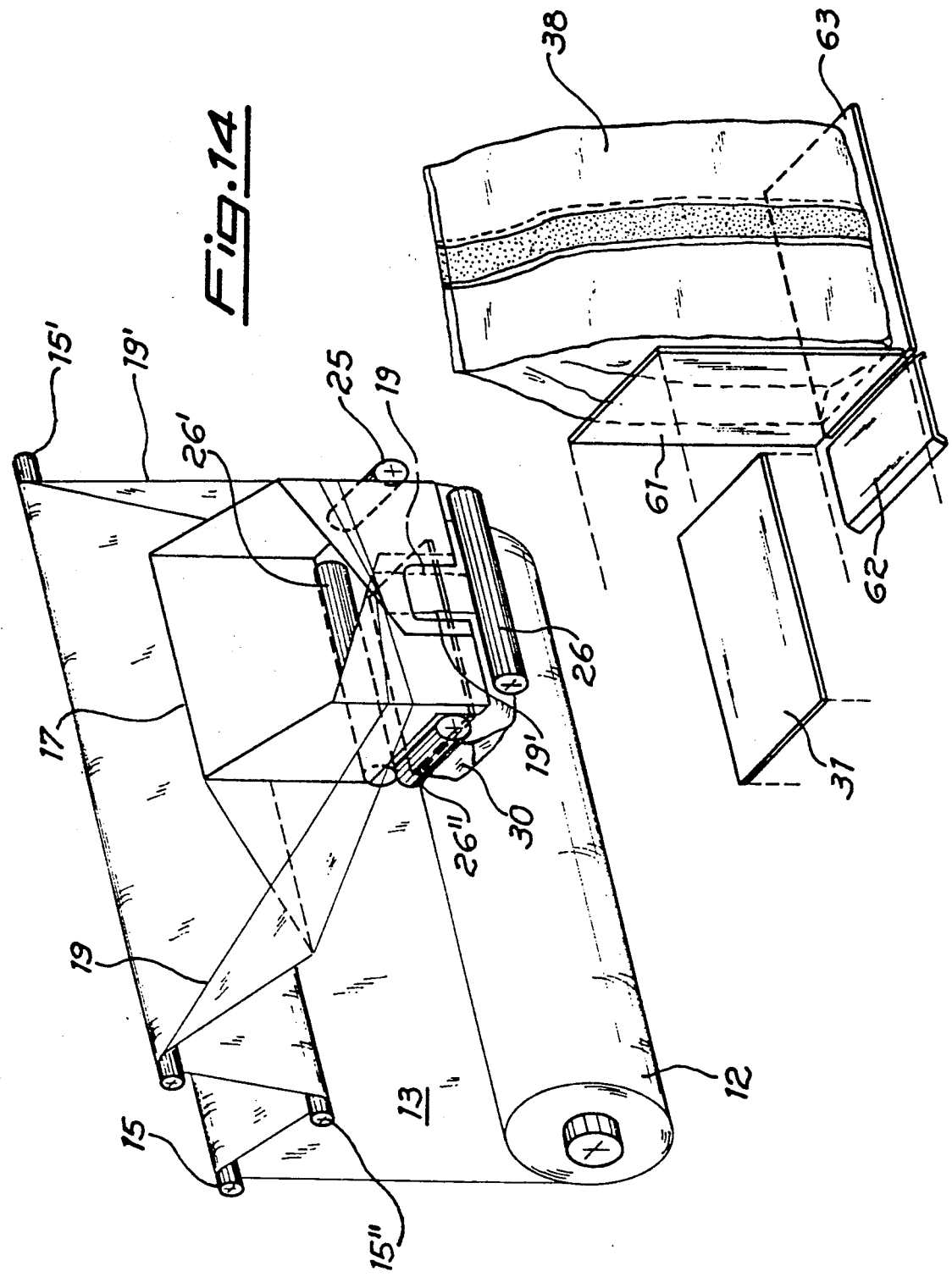

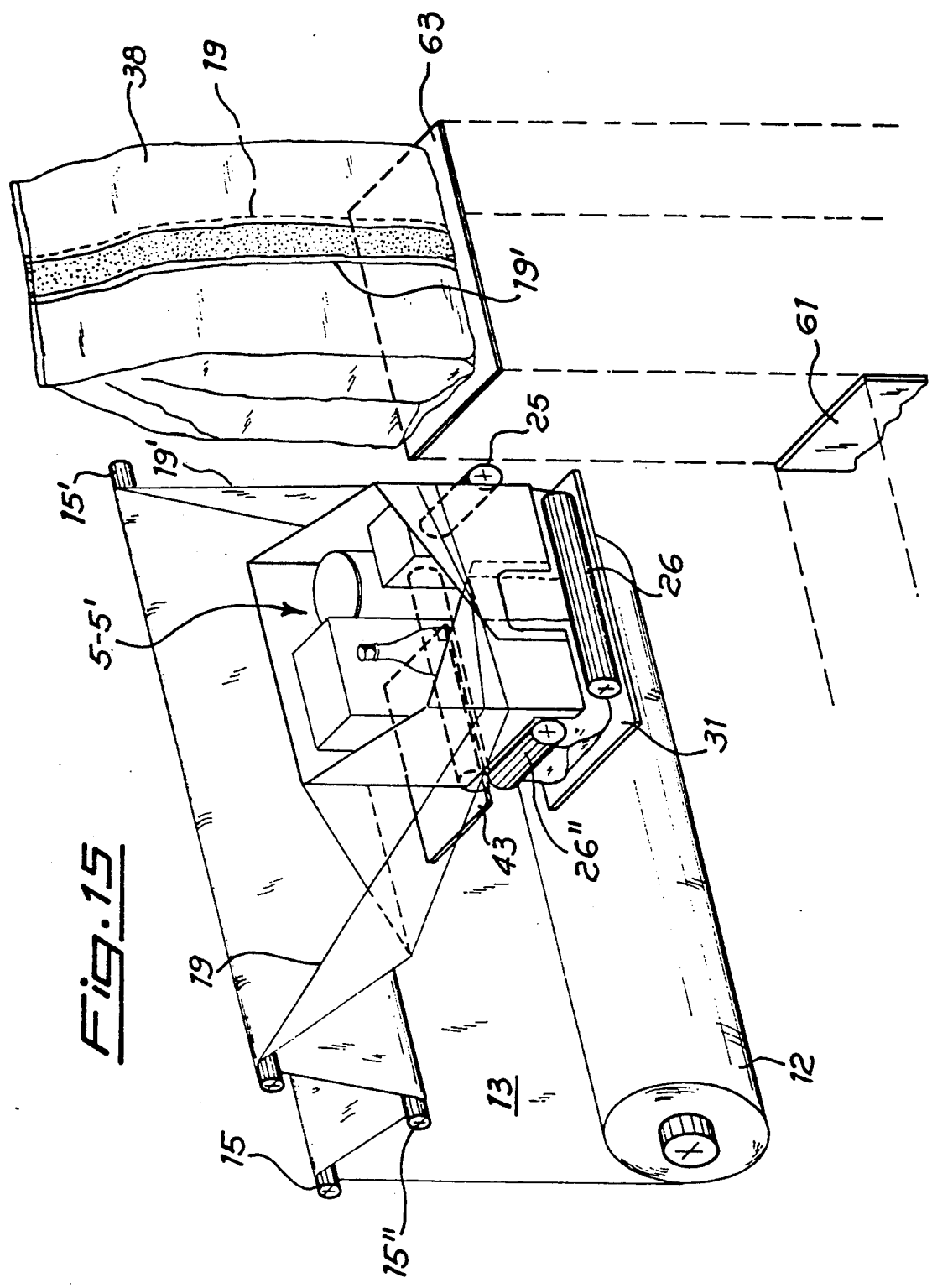

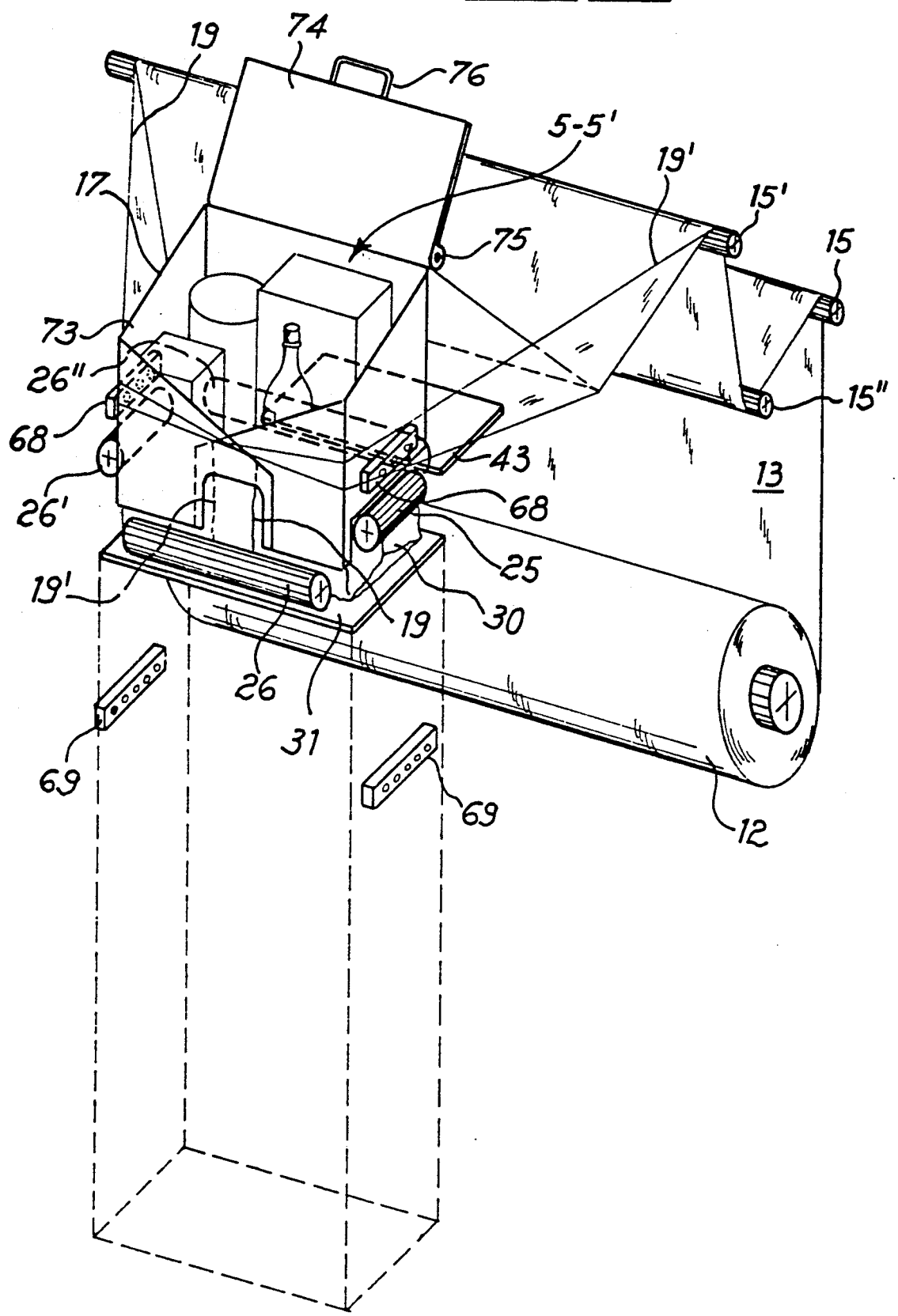

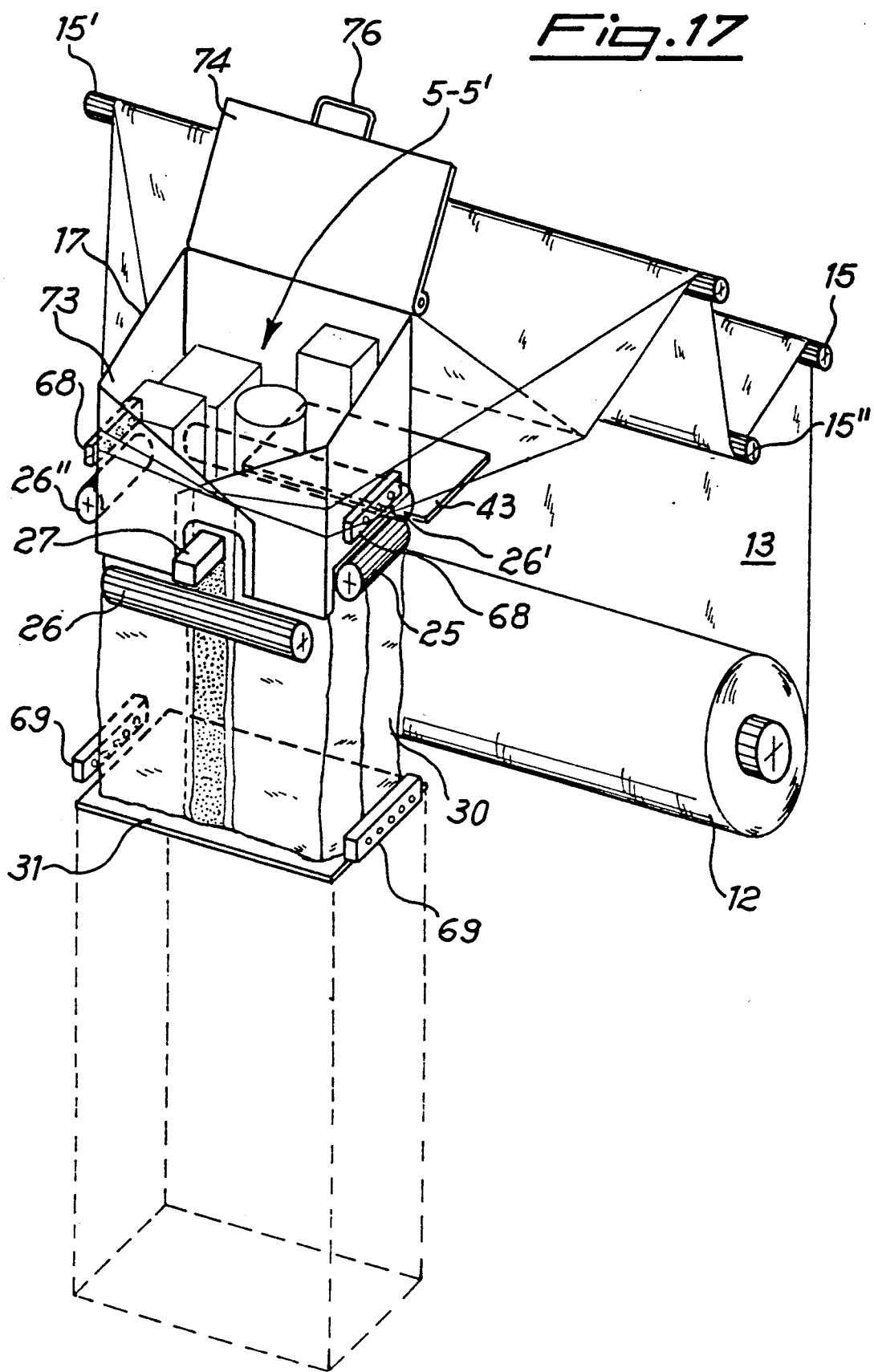

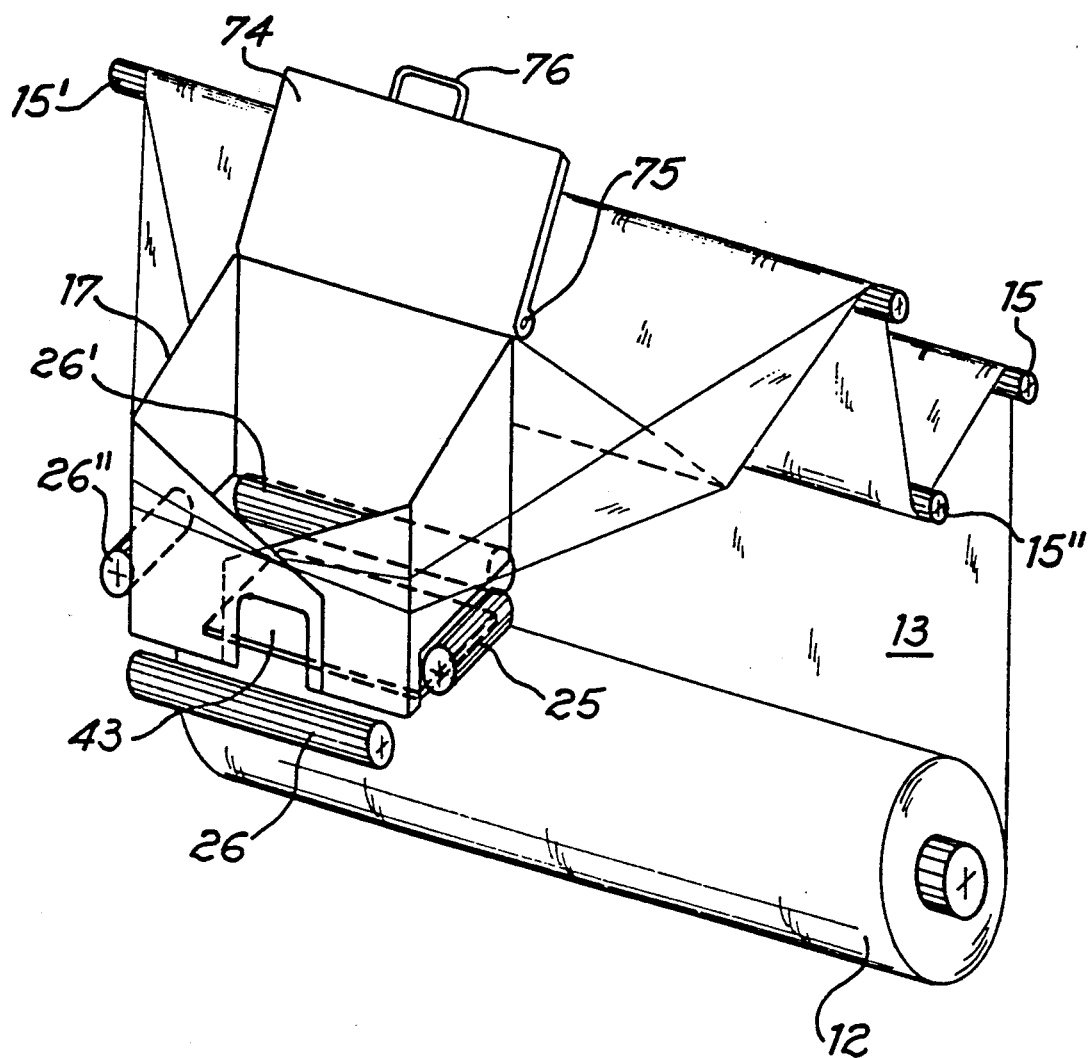
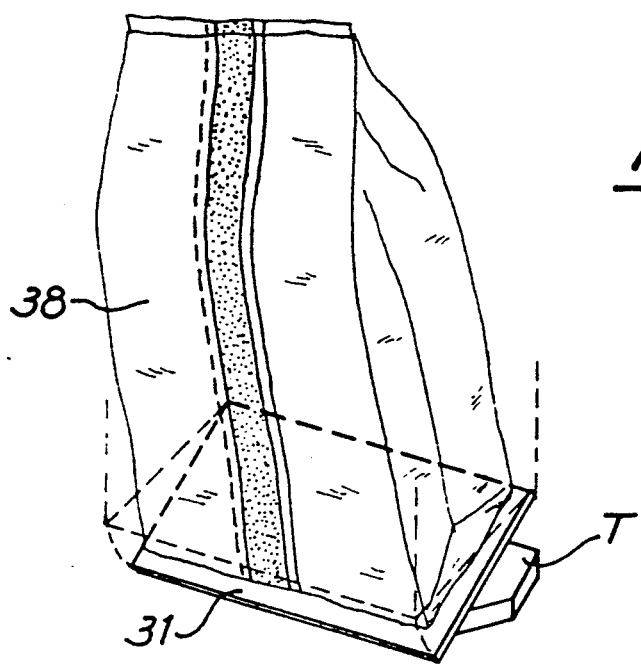
Fig. 21

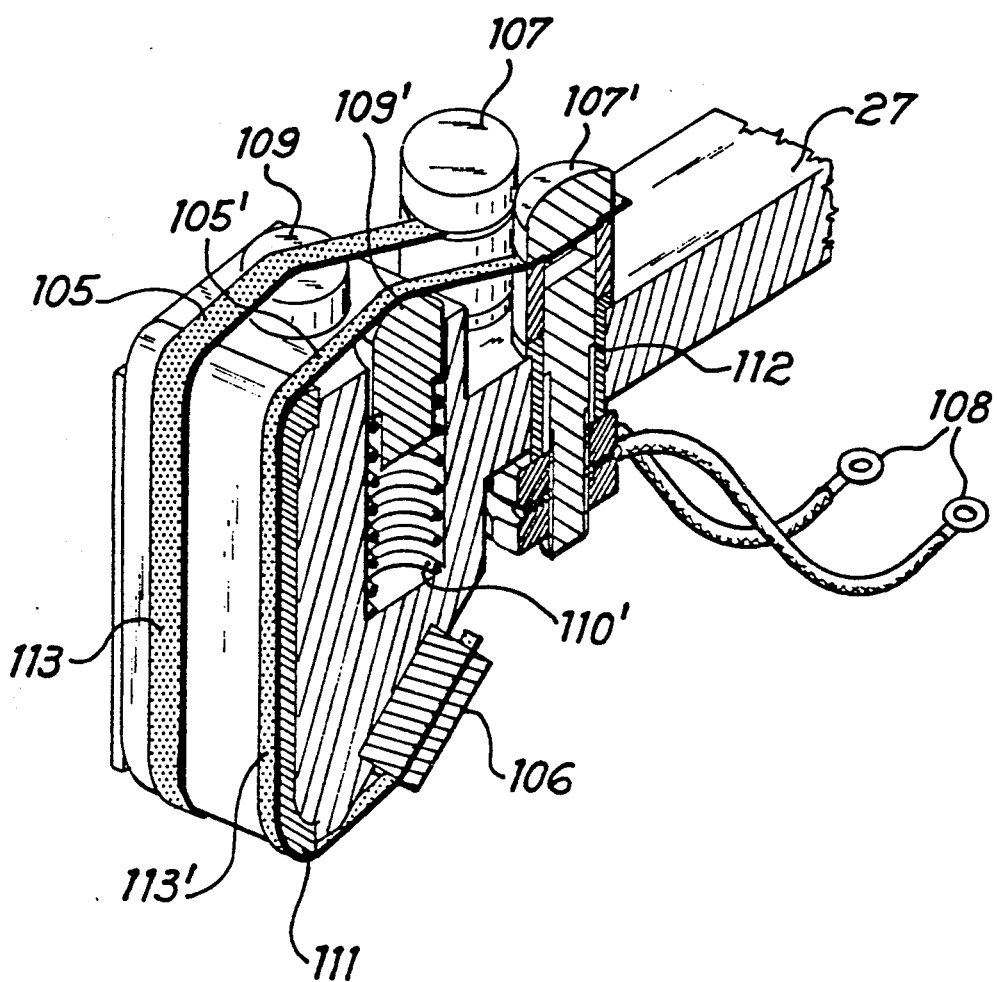

METHOD AND APPARATUS FOR ON DEMAND MANUFACTURING OF CUSTOM-SIZED BAGS CONFORMING TO THE VOLUME OF ARTICLES RECEIVED THEREIN AT A CHECK-OUT COUNTER

This is a continuation of U.S. application Ser. No. 07/851,234, filed Mar. 13, 1992, now abandoned; which is a continuation of Ser. No. 07/703,595, filed May 20, 1991, now abandoned; which is a continuation of Ser. No. 07/568,544, filed Aug. 15, 1990, now abandoned; which is a continuation of Ser. No. 07/090,964, filed Aug. 28, 1987, now abandoned.

BACKGROUND OF THE INVENTION

1. Field of the Invention

The present invention relates to the manufacture of flexible article-receiving bags, and to the configuration and structural and functional features of said bags. It is more particularly directed to a method and apparatus for on site and on demand manufacturing of flexible bags, custom-sized to conform to the volume of articles packed therein, at a check-out counter of, for example, a supermarket or other sales establishment, and to the flexible bags thereby produced.

2. Description of the Prior Art

Current practice at supermarkets is to have a cashier operator register, either by automated scanner or direct manual keyboard entry, or both, the prices of the various articles purchased by a customer. The cashier, an assistant, or the customer then places the articles or goods in a bag which has generally been preformed most commonly either of plastic material or of paper. Such an operation is time consuming and awkward and often results in inefficient and awkward processing of customers through the supermarket checkout counter. Similar practices and attendant problems exist at department stores and other retail establishments.

The paper and plastic bags currently in use exhibit several noteworthy drawbacks that negatively impact upon both customer convenience and merchant efficiency and costs. The bags, after the purchased goods have been placed therein, remain open at their tops. This creates the substantial risk and not uncommon occurrence that the bags' contents may inadvertently spill out of the bags as the customer removes them from the store to their eventual destination—particularly when the bags are transported by car or bicycle or the like, and even when they are hand carried.

Moreover, in order to properly accommodate the great majority of customer purchases, the preformed bags are sized with sufficiently large dimensions for holding a substantial number of articles. In actual use, however, the volume of articles packed in the bags varies greatly from bag to bag resulting in customer difficulty and inconvenience in manipulating a combination of filled and partially filled open-topped bags, in substantial waste of materials and in increased cost to the merchant.

BRIEF DESCRIPTION OF THE DRAWINGS

In the drawings, wherein like reference characters denote similar elements throughout the several views:

FIG. 3 is a partially sectioned side elevational view taken along the lines III—III of FIG. 1;

FIG. 4 is a partially sectioned front view of the apparatus looking from the left in FIG. 3;

FIG. 5 is a sectional view taken along the lines V—V of FIG. 3;

FIGS. 9 to 15 are partial schematic perspective views of the apparatus during the various phases of the process of filling and forming a custom-sized bag in accordance with one embodiment of the invention;

FIGS. 16 to 21 are partial schematic perspective views of the apparatus during the various phases of the process of filling and forming a custom-sized bag in accordance with another embodiment of the invention;

DETAILED DESCRIPTION OF THE PREFERRED EMBODIMENTS

Figure 1:
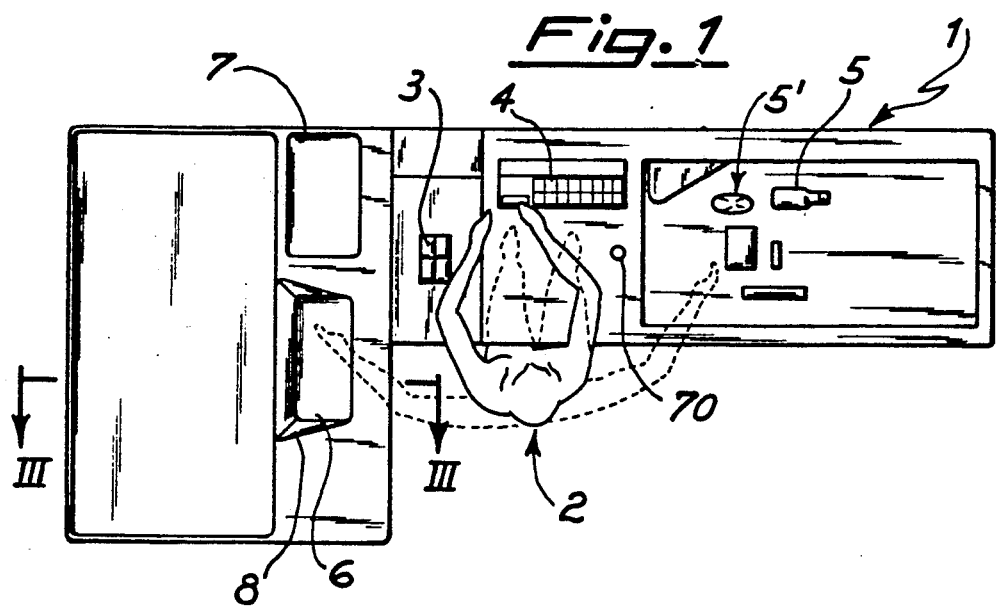
FIG. 1 is a plan view of a supermarket check-out counter in accordance with one illustrative form of the present invention.
Figure 2:
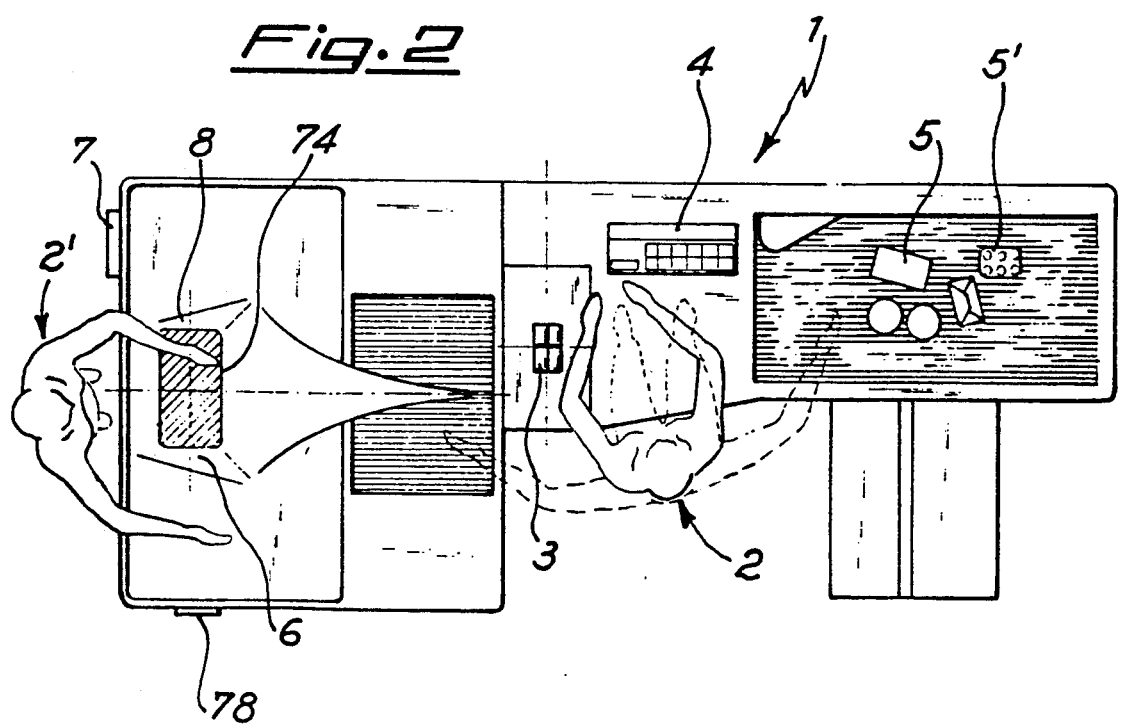
FIG. 2 is a plan view of a supermarket check-out counter in accordance with another illustrative form of the invention.

Two alternate embodiments of a supermarket check-out counter 1 constructed in accordance with the present invention are respectively illustrated in FIGS. 1 and 2. In each, a supermarket counter 1 situated before a workplace occupied by a cashier 2 is provided with an automated scanner 3 and a keyboard 4 or, alternatively or additionally with a manually operable cash register. There is usually and preferably a conveyor belt onto which the customer places articles or items 5, 5' which, after cashier 2 has registered their prices by means of the scanner or through manual entry at the keyboard, are advanced by the conveyor belt for insertion by cashier 2 or by the customer 2' into an opening 6 defined in the top surface of counter 1. Other arrangements, of course, including manual means, may be employed to advance the items along counter 1. In any event, it is intended in the embodiment of FIG. 1 that the bag be packed by placing the purchased goods or articles 5, 5' into and through counter opening 6. The check-out counter of FIG. 2 is especially configured to facilitate the packing of purchased articles by the customer 2' as will hereinafter be described, although the customer can assist packing with either arrangement.

Referring now to FIGS. 3 and 4, a first embodiment of the apparatus for forming the bag, which is incorporated within the confines of check-out counter 1, comprises a roll 12 of support and drive rollers 14, 14' which, when driven by a drive motor (not shown), rotate to turn roll 12 and thus cause material or film 13 to unwind from the roll. Sheet material 13 may be plastic, preferably thermoplastic, or other suitable flat continuous sealable material, such as plasticized paper. Examples of such materials are polyethylene, polypropylene, polyvinylchloride, and paper coated with or laminated to such plastics.

Film 13 is drawn from roll 12 and is guided around jockey rollers 15, 15' and intermediate tensioning roller 15", the latter of which is movably mounted on a constant tension frame 16 as is well known in the art. After passing over jockey roller 15', film 13 passes along a pair of guiding planes or surfaces 18, 18' disposed in a generally V-shaped orientation, passing under plane or surface 18, through gap 18" between the planes, over plane 18' and into the interior of a generally quadrangular hollow former 17 in such a way that, as will hereinafter become clear, the longitudinal film edges 19, 19' overlap to form a continuous tubular wrapper 20. More particularly, planes 18, 18', which are disposed with an opening or gap defined between their respective lower edges, each progressively tapers in its transverse dimension or width in the direction of film movement. Thus, plane 18 gradually narrows from its top-disposed edge adjacent roller 15'—which edge is dimensioned at least as wide as the width of the film—to its lower edge. And plane 18' similarly narrows from its lower edge —which is of substantially the same width as the adjacent lower edge of plane 18—to its uppermost edge which is disposed adjacent former 17 and has substantially the same width as the former. This arrangement facilitates the translation of film 13 from its initially flat condition to a tubular wrapper 20 within former 17. It should nevertheless be recognized that alternate arrangements—such as a suitably dimensioned roller mounted at the approximate location of the gap defined between planes 18, 18'—may be substituted for the V-disposed planes 18, 18' to implement the same function.

Figure 6:
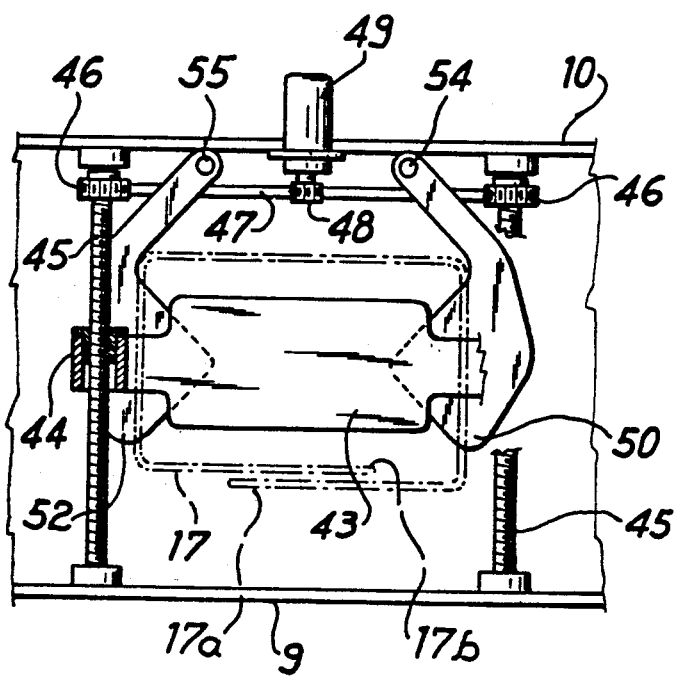
FIG. 6 is a sectional view taken along the lines VI—VI of FIG. 4.

Former 17 is located under and may project partly through the top surface of counter 1 and in register with opening 6 through which goods to be packed are introduced. As perhaps best seen in FIG. 6, the front face of the former 17—i.e. that face most remote from film roll 12 and guide planes 18, 18'—is not continuous but rather is formed by overlapping and spaced apart wall extensions 17a, 17b. Extensions 17a, 17b cooperate with film 13 to form therefrom the continuous tubular wrapper 20 with the film edges 19, 19' in superimposed or overlapping relation (see for instance FIGS. 9 and 19). Thus, from jockey roller 15' the film is guided along the underside of plane 18, through the gap 18" defined between the planes 18, 18', along the upper face of plane 18' and into the interior of former 17. As shown in each of FIGS. 9 to 15, the transverse narrowing of planes 18, 18' and the spaced apart wall extensions 17a, 17b cause the film 13 to enter the former and form the tube 20 immediately adjacent and continuously along the interior walls of the former.

The tubular wrapper 20 is thus formed from the single film sheet material 13 along the interior substantially vertical walls of former 17. It should nevertheless be apparent to those skilled in the art and having knowledge of this disclosure that numerous alternative arrangements for converting the film sheet into a continuous tube may be employed in accordance with the invention. For example, former 17 may be modified to eliminate its entire lower portion below the top edges or lips over which the film 13 is guided into the shape of a tube. On the other hand, formation of the tubular wrapper 20 may instead be carried out about and around the exterior surfaces of a mandrel as is known in the art; such an arrangement is, for example, disclosed in U.S. Pat. No. 3,903,672. These and other modifications in the means for converting the continuous film sheet to a tubular wrapper are within the scope and contemplation of the invention.

The opening 6 in the top surface of counter 1 is internally provided with a downwardly extending mouthpiece or collar 8 which is inwardly spaced from and within former 17 so that the tubular film wrapper 20 is disposed in the channel defined between the walls of the collar and the former. Collar 8 delineates a chute for the introduction of goods to be packed, and also prevents potentially damaging contact of the introduced goods with film 13 before the tubular wrapper 20 is fully formed and the resulting bag completed.

The continuous flat film material 13 is advanced downwardly along and within former 17 by rotation of a set of rollers 25, 26, 26', 26", mounted respectively about the lower wall portions of the former and collar. Roller 25 is directly driven by a motor 21 and a chain 22 connecting the roller and the motor shaft. Rollers 26, 26' and 26" are in turn rotated by the turning of roller 25 through helical gears 23, 23' and conical gears 24, 24'. Specifically, roller 25 carries, at its opposite ends, a helical gear 23 which engages roller 26, and a conical gear 24 in engagement with roller 26'. Roller 26 and 26', in turn, carry at their ends opposite roller 25 a helical gear 23' and a conical gear 24', respectively, which operatively engage roller 26" at its opposite ends. Thus, motor driven rotation of roller 25 effects corresponding rotation of rollers 26, 26' and 26". These four rollers, disposed such that rollers 25 and 26", and rollers 26 and 26' are respectively parallel and of like dimensions, project through suitable openings in former 17 and into engagement with tube-formed film 13. The film is thereby interpose and pressed between the rollers and collar 8 and thereby drawn downwardly within former 17 as motor 21 is predeterminately operated in accordance with the invention.

As film 13, in the form of tubular wrapper 20, is downwardly drawn within former 17 its overlapped longitudinal edges 19, 19' are joined by a longitudinal heat sealing or welding device 29 (FIG. 3). Device 29, which will be fully described hereinafter, includes a heated welding head 27 which is moveable by operation of an electromagnet 28 to press the overlapped film edges 19, 19' of the longitudinally advancing film tube between head 27 and collar 8. The closed tubular wrapper 20 thereby obtained is subsequently transformed into a bag 30 by a transverse heat seal which forms the bottom of the bag as will soon become clear.

Referring now to FIGS. 3 and 5, the bag forming apparatus further includes a loading platform 31 for supporting the bottom of bag 30 as articles to be packed are introduced by the cashier or customer into the counter opening 6. Loading platform 31 is arranged for vertical movement from a fully raised position immediately below former 17 and collar 8 to a fully lowered position adjacent the bottom of the machine frame, the latter positions being shown in FIG. 3. A bracket 34 which is fixed to and supports loading platform 31 is connected to a lead screw 33 engaged with a rotatable threaded bar 32 to which rotative motion is selectively applied by an electric motor (not shown). Thus, depending upon the direction of rotation of threaded bar 32, lead screw 33 is moved along bar 32 to raise or lower platform 31. As will soon become evident, the descent of loading platform 21 may also be halted at any height or level during operation of the apparatus as a function, for example, of the volume or weight of the articles introduced into bag 30.

In order to distribute the load on platform 31 and to insure a smooth passage for the platform, a pair of guide bars 35 are provided adjacent threaded bar 32 (FIG. 4). Two unthreaded apertures in lead screw 33 receive the guide bars with a close sliding fit. Of course, other guide means may additionally or alternatively be employed as a matter of design choice.

Figure 7:
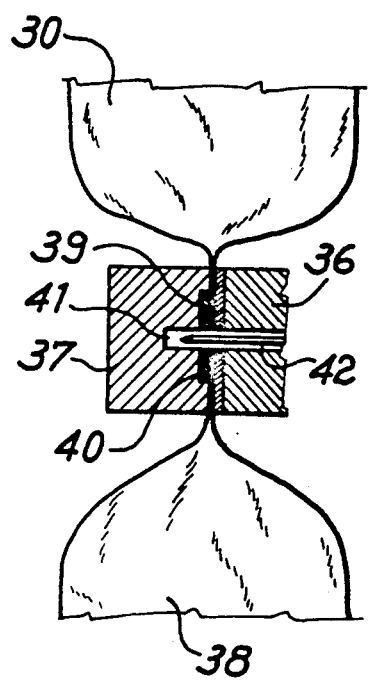
FIGS. 7 and 8 are enlarged sectional views of a sealing and transverse cutting means of the invention shown during cutting and sealing, and after cutting and sealing, respectively.
Figure 8:
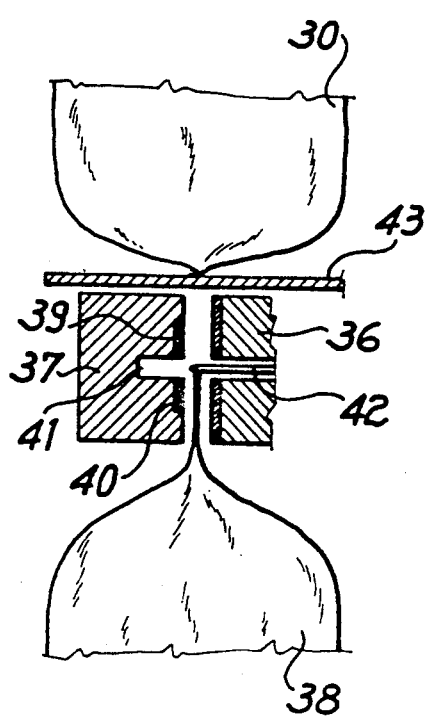

A transverse sealing means for closing a full bag 38 and for concurrently creating the bottom of a bag 30 next being formed is illustrated in FIGS. 7 and 8. The transverse sealing means there shown comprises a pair of elements 36, 37 are elongated and extend transversely of the direction of travel of the bag forming material and which are relatively reciprocably movable into mutually abutting engagement while the tubular wrapper 20 is interposed between them. Element 37 carries a pair of transversely elongated welding plates 39, 40 separated by and located immediately adjacent a notch 41. A transverse blade 42 —which is preferably but not necessarily serrated or jagged—fixed to reciprocating element 36 projects outwardly beyond element 36 in the direction of element 37 in register with notch 41.

As reciprocating elements 36, 37 are relatively moved into mutual engagement with interposed tubular wrapper 20, the wrapper is transversely heat sealed along two spaced apart lines defined by welding plates 39 and 40. Thus, lower welding plate 40 effects heat sealed closure of the top of a bag 38 already filled with articles, while upper welding plate 39 heat seals closed that portion of continuous tubular wrapper 20 above bag 38 to thereby create the bottom of the next bag 30 being formed. At the same time, blade 42 performs a transverse cut between the upper and lower heat seal closures as the blade enters notch 41 whereby the full bag 38 is detached from the overhanging bag 30 on which a bottom closure has concurrently been created.

A platform 43 for temporarily supporting the bottom of the bag 30 being formed is arranged for substantial horizontal movement between a first position above reciprocating elements 36, 37 and immediately under the bottom of the bag 30 (FIGS. 6, 13) and a second position laterally remote from said first position (FIG. 15). This movement of the platform 43 is effected by selective bidirectional rotation of a pair of lead screws 45 along which nuts 44 fixed to opposite ends of platform 43 are threadedly engaged. Lead screws 45 carry on their ends gears 46 and are rotated by operation of bidirectional motor 49 through a gear 48 on the motor shaft and a timing or toothed belt or chain 47 connecting the gears 46 and 48. Platform 43 is brought to and attains its first position immediately under the bottom of the bag 30 being formed when, upon detachment of the full bag 38 supported by loading platform 31, reciprocating elements 36, 37 begin to move apart so that the tubular wrapper is no longer gripped therebetween. The presence of platform 43, in its first position, thereby permits the introduction of articles into the new bag 30 being formed even before the full and sealed bag 38 has been moved to a discharge or ejection station by platform 31 and platform 31 is thereafter returned to its bag supporting position. Thus, platform 43 enables the entire loading process to be accelerated although, if desired, platform 43 may be omitted in which case the loading of the new bag 30 will await the return of platform 31.

The bags formed by the apparatus are preferably gusseted or pleated. The device for gusseting the bags may be seen, for example in FIGS. 6 and 12, where two pairs of folders 50, 51 and 52, 53 are disposed for pivotally reciprocating movement about pins 54, 55 along two horizontal planes respectively above and below reciprocating elements 36, 37. Inward movement of the folders from their FIG. 12 extreme outer position carries their free ends into engagement with the opposite sides of the now tubularly formed wrapper 20 for the purpose of forming a pleat or gusset on each of the opposite sides of the bag 30 being formed and of a filled bag 38 which is about to be sealed closed. Folders 50, 51, 52 and 53 are driven by any suitable reciprocating drive means (not shown) in timed relation with the various other operating elements of the apparatus as will hereinafter be described.

The means for ejecting a sealed, full bag 38 is seen in FIGS. 3 and 5 and comprises a motor 57 whose shaft or shaft extension is threaded as a lead screw and threadedly engages a lead screw nut 59 to which a bracket 60 is connected. Bracket 60 is driven along a substantially horizontal plane guided by elongated rods 58, 58' which are disposed parallel of motor 57 and which are slidably journalled through apertures defined in lead screw nut 59. Attached to bracket 60 for movement therewith is a substantially vertical pusher 61 for shifting a full bag 38 which has been detached from the continuous tubular wrapper 20, from the fully lowered loading platform 31 to a discharge or ejection platform 63, as will be more fully described hereinafter. The shifting of bag 38 takes place between opposed lateral walls 71, 71' which maintain the orientation of the bag 38. The movement or shifting of bag 38 is preferably along a fixed planar surface 62 interposed between the lowered platform 31 and discharge platform 63, although fixed surface 62, while desirable, is not necessary to this invention.

In one form of the invention, platform 63 discharges a completed and packed bag 38 by vertically raising the bag 38 up to and through, in the raised position of platform 63, a discharge or ejection opening 7 (see FIG. 1) defined in the top surface of counter 1. This will permit a full bag 38 to be easily picked up and removed by the customer. Such an arrangement for vertically reciprocating the discharge platform 63 may of course take a variety of constructions. As shown by way of illustration, the discharge platform raising and lowering means includes a bracket 64 secured to the bottom of platform 63 and fixed to a lead screw 65 nut threadedly engaged for vertical movement along a rotatable lead screw 67 (see FIG. 5). Depending upon the direction of rotation of lead screw 67, discharge platform 63 will move up or down between its fully lowered position adjacent stationary planar surface 62 (if used) and a raised position, preferably below ejection opening 7 in counter 1. A pair of guide rods 66, 66' parallel to lead screw 67 and slidably journalled through lead screw nut 65 provide enhanced guidance for the lead screw and for the movement of platform 63.

In an alternate embodiment (FIG. 2), platform 63 is not vertically movable for discharging a full bag 38 through counter opening 7 (which is omitted) but may, instead, be arranged for lateral and/or ramped transport of the full bag to an opening defined in a vertical side or end wall of the check-out counter. In such an arrangement, described hereafter in further detail, the full bag 38 is nevertheless also thereby delivered to a position readily and conveniently accessible to the customer for pick up and removal of the filled bag.

Figure 9:
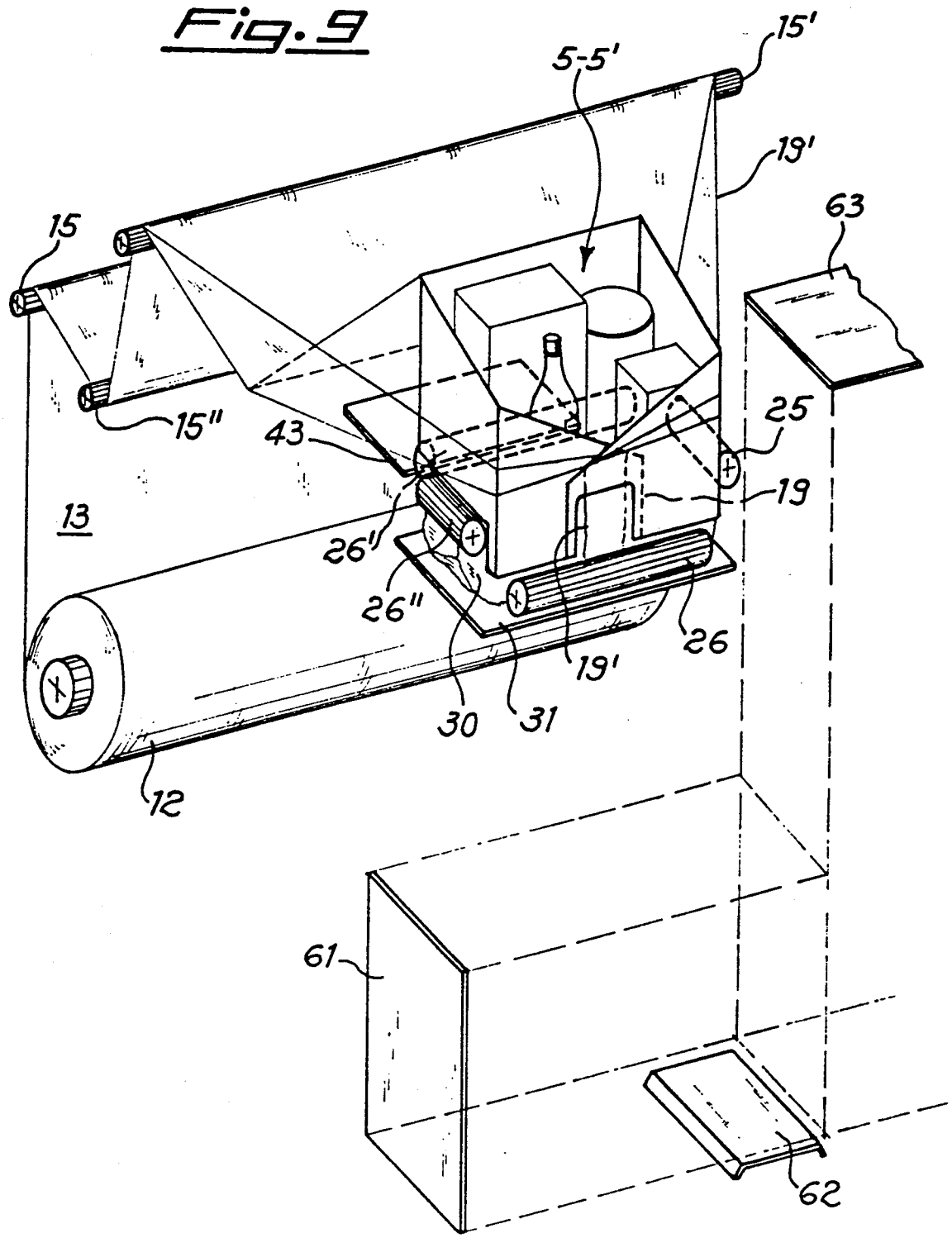

The bag forming apparatus of the invention is also provided with means for determining the position or relative position of loading platform 31 along the vertically reciprocated path between its fully raised position seen in FIG. 9 and the FIG. 13 fully lowered position. If planar surface 62 is employed, the fully lowered position is adjacent to and substantially level with the planar surface 62. It will be recalled that platform 31 is reciprocated through motor driven rotation of vertically disposed lead screw 32 as, for example, by an end-mounted gear 115. In the disclosed form of the invention, the platform position determining means comprises a disc 116 mounted on and rotatable with threaded bar 32, and a sensor 117 for detecting rotations of disc 116 (FIG. 3). The combination of disc 116 and sensor 117 may take any of a variety of forms such, for example, as an optically-readable marking or delineation on the disc for detection by optical sensor 117 with each rotation of threaded bar 32 and disc 116 or, in another arrangement, a structural projection from a cam-like disc 116 for actuating engagement with a mechanical switch or sensor 117 as the disc rotates with lead screw 32. By counting the number of rotations carried out by lead screw 32 as platform 31 is raised and lowered, changes in the position or height of the platform can be fairly precisely determined in conjunction with the platform distance known to be traversed during each rotation of lead screw 32. And, given the initial position or height of platform 31, its final position following each subsequent movement will likewise be known.

Those skilled in the art will of course recognize that numerous alternative and/or supplemental arrangements may be employed to monitor or track the position of and amount of vertical movement undergone by loading platform 31. Such alternate implementations, which may or may not use or depend upon the rotation of lead screw 32, are nonetheless within the scope and contemplation of the invention.

In accordance with a particular feature of the invention, it is, as will hereinafter become evident desirable in some forms of the bag forming apparatus to monitor the weight of a bag 30 being formed as articles are placed or packed therein. For this purpose, a flat plat-type sensor 118 (FIG. 3) may be carried on loading platform 31 so that a bag 30, during the placement of articles therein, is directly supported on the weight sensor 118 which is thus interposed between platform 31 and the bag 30. Sensor 118 may comprise any convenient and conventional apparatus capable of generating an output related to the weight of an object supported thereon to the controller of the inventive bag forming and check-out counter system.

The bag forming apparatus additionally includes upper and lower pairs of sensor arrays 68, 69, respectively, operable for detecting the relative volume or level to which articles have been received within a bag 30 being formed. Each of the sensor array pairs may comprise conventional infra-red optical transmitter-receivers which emit and are sensitive to the receipt of low frequency infra-red emissions capable of penetrating films —whether or not transparent—of the type used for material 13 from which bags are formed by the apparatus of the invention. The infra-red rays are, on the other hand, obscured by and will not fully pas through the relatively solid articles packed in the bags 30.

Figure 10:
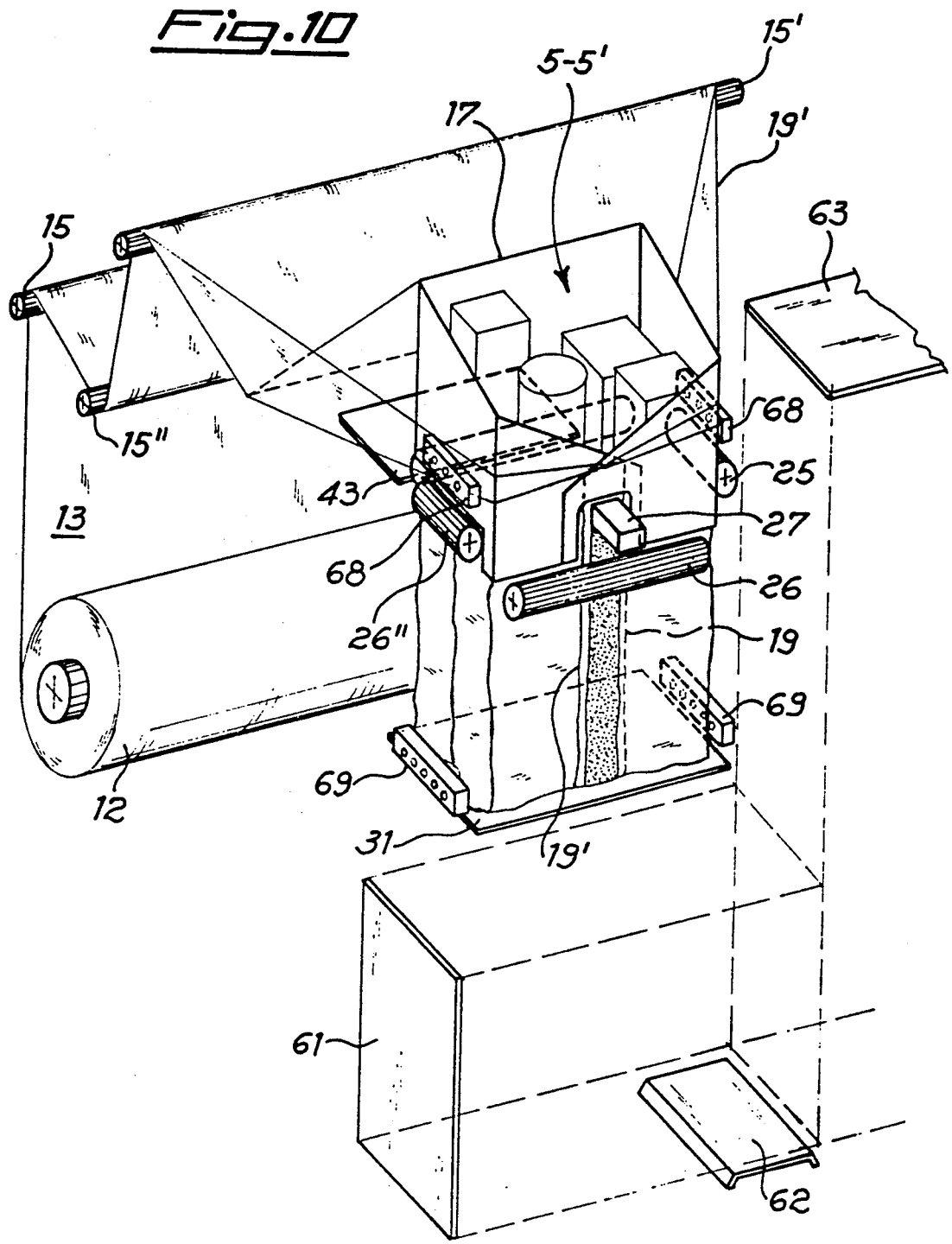

Upper sensor arrays 68 are horizontally positioned and relatively aligned externally of the opposed sidewalls of former 17 at the upper portion of the former and immediately under counter 1 (see, for example, FIGS. 3 and 10). Arrays 68 are additionally aligned with cutouts defined in former 17 and in collar 8 through which the infra-red rays are thereby permitted to pass for detecting the passage of articles into a bag 30 being formed and the height or level of articles inserted in the bag. Lower sensor arrays 69, also horizontally aligned relative to each other, are positioned below reciprocating elements 36, 37.

The various functional elements and assemblies of the bag forming apparatus are connected to and sequentially operated in accordance with the invention by a controller (not shown). Because the controller, which may take any of a variety of mechanical, electromechanical and/or electrical and electronic forms well known in the art, is deemed to be within the mechanical ability of one skilled in the art having knowledge of this disclosure, its details are not specifically disclosed herein. Such a controller may nevertheless be readily implemented without undue experimentation in accordance with the teachings of the invention.

The operation of the bag forming apparatus may be best understood with reference to FIGS. 9 to 15 which sequentially illustrate the formation and completion of a custom-sized bag containing a plurality of goods or articles 5, 5'. In FIG. 9, the bag 30 is supported at its bottom by loading platform 31 which is located in its uppermost raised position. It is of course preferred that goods be so placed in the bag 30 as to most fully and efficiently exploit the available space inside it. The bag forming machine permits and facilitates an intelligent and efficient distribution of articles placed inside the bag in that, during this operation, platform 31 and therefore the bag 30 supported thereon is maintained in its fully raised position shown in FIG. 9.

When the bag 30 has been substantially filled with articles, and there remain additional goods to be packed, the longitudinal dimension of the bag may be increased by actuation of a manual control or pushbutton 70 provided for example on the top surface of counter 1. Control 70, which may be manually actuated by either the cashier or the customer, is connected to the apparatus controller and, when operated, causes a predetermined rotation of rollers 14, 14' to further unwind film 13 from about roll 12. Rollers 25, 26, 26' and 26" are also actuated to advance the film downwardly within former 17, thereby extending the length of tubular wrapper 20 as the longitudinal edges 19, 19' of the advancing film 13 are heat sealed together. At the same time, threaded bar 32 is rotated to lower the loading platform 31 by a preset distance, as for example 24 cm, until the bottom of the bag 30 which is supported on platform 31 reaches a position immediately below lower sensor arrays 69 (FIG. 10).

Figure 11:
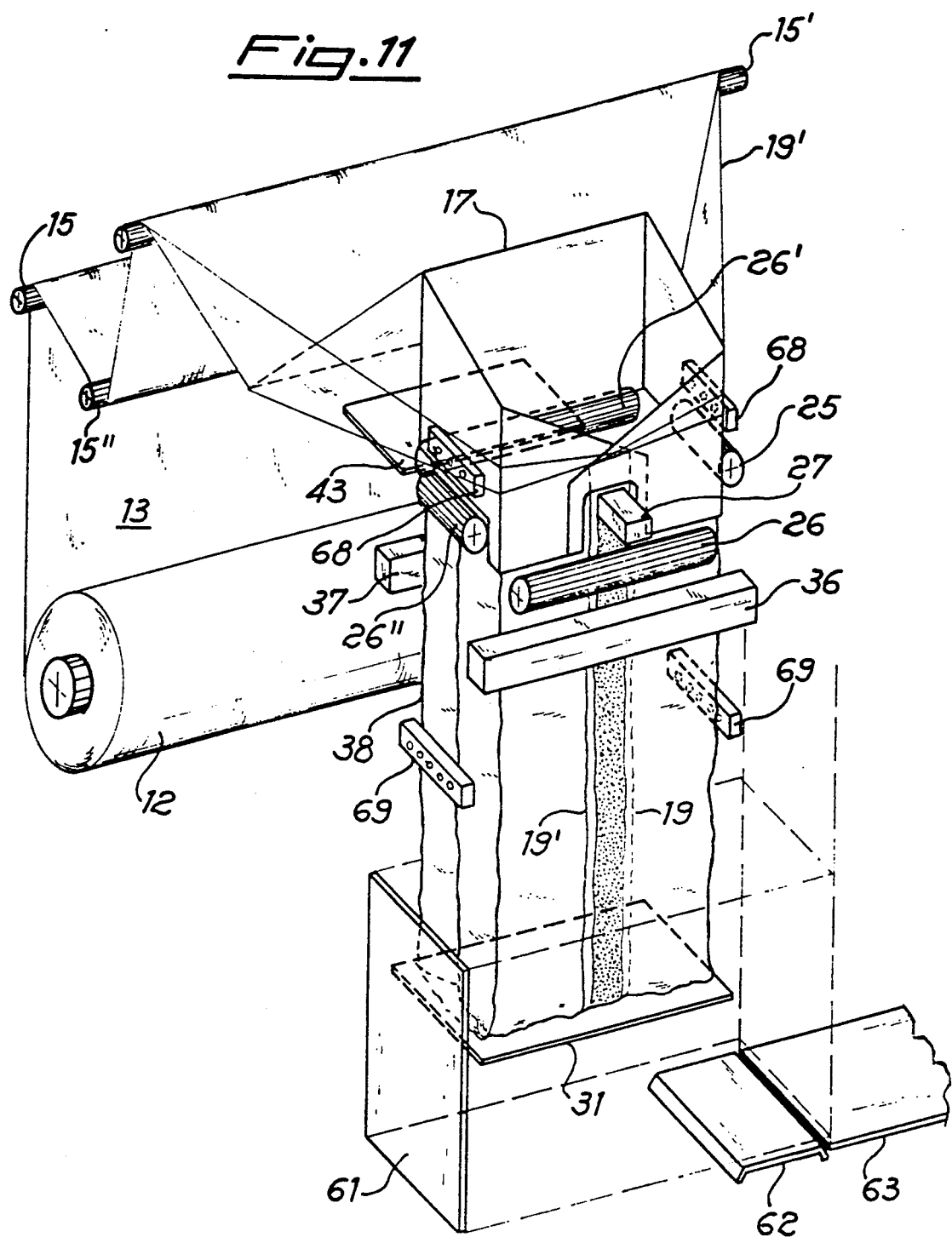

During and following the completion of this first descent of loading platform 31 the loading of articles into the bag 30 continues until either there remain no additional goods to be packed or all of the available space within the bag has been filled. In either case, the cashier or customer once again manually actuates control 7 causing loading platform 31 to resume its descent as seen in FIG. 11. This second descent of platform 31 is automatically halted when all of the articles packed in bag 30 descend below lower arrays 69 and the infra-red rays are thus no longer blocked by articles packed within the bag. At this point, then, the maximum level reached by the goods packed in the bag 30 is positioned immediately below the level of lower sensor arrays 69.

Although the bag forming apparatus of the invention is capable of producing bags of various lengths custom-sized in accordance with the quantity or volume of goods packed in the bag, the apparatus is preferably constructed for forming bags up to a predetermined maximum length. The length of the maximum size bag formable by the apparatus may be determined or preset on the basis of a number of factors including the size and height of the check-out counter within which the apparatus is incorporated and the ability of the average customer to conveniently transport the resulting filled bags from the store. In any event, the descent of loading platform 31 may also be halted automatically by a determination that the bag has been loaded with goods to a height which would otherwise result in a bag larger than the maximum size bag formable by the apparatus. This feature is implemented by monitoring the output of top sensor arrays 68 when, during the descent of loading platform 31, the platform reaches a distance from the top arrays equal to the maximum predetermined height that a bag formed by the apparatus may have. When platform 31 has reached this point in its descent and top arrays 68 continue to detect the presence of articles between them, further descent of platform 31 is halted and a signal—such as an audible and/or visible alarm—is generated to alert the operator that the bag contains an excessive volume of goods. The operator must then remove a quantity of articles sufficient to clear the area between top arrays 68 and, once done, downward movement of platform 31 resumes. As previously indicated, the descent of the platform is automatically halted when the topmost articles in bag 30 pass below lower arrays 69 and the sensors of the lower arrays are thereby once more illuminated.

In addition to assuring that the maximum height of bag 30 be limited to a predetermined size for, inter alia, the convenience of the customer, it is also desirable to provide that the completed bag be of no more than a maximum weight which, similarly, may be conveniently borne by the customer in transporting the bag from the store or which represents the maximum weight such a bag can securely carry. Weight sensor plate 118 on loading platform 31 generates an output which is continuously monitored by the controller and, should the weight of the goods-containing bag 30 meet or exceed the predetermined maximum permissible weight of the bag, an alarm is generated and the loading platform automatically initiates its descent to that position in which the topmost goods in the bag are disposed immediately below lower sensor arrays 69. In this manner, the apparatus assures that the bag which is formed is of no more than a predetermined weight readily transportable by the customer and contains goods having a combined weight suitably within the elastic limits and tensile characteristics of the film material 13 from which the bag is formed.

In the event that all of the articles to be packed have been placed and fit within the bag 30 while loading platform 31 remains in its uppermost (FIG. 9) position, it is not of course necessary to perform the second phase of loading during and following a subsequent descent of platform 31 to its secondary (FIG. 10) position. Under these circumstances, the operator instead manually actuates or depresses pushbutton 70 twice in succession whereby platform 31 descends not by the preset amount normally traveled from its uppermost position but, rather, through a free run which stops as soon as the topmost goods packed in the bag 30 clear and are disposed immediately below the level of lower sensor arrays 69.

In each of the foregoing situations, when control 70 is actuated for a second time (or weight sensor plate 118 detects that the total weight of the packed goods meets or exceeds a predetermined maximum value) and the topmost goods in bag 30 are positioned below top arrays 68, the downward movement of ejection platform 63 from its then current position to a point at which all goods are disposed below lower arrays 69 is automatically initiated. This descending movement of ejection platform 63 is effected in a single, continuous and uninterrupted motion.

Figure 12:
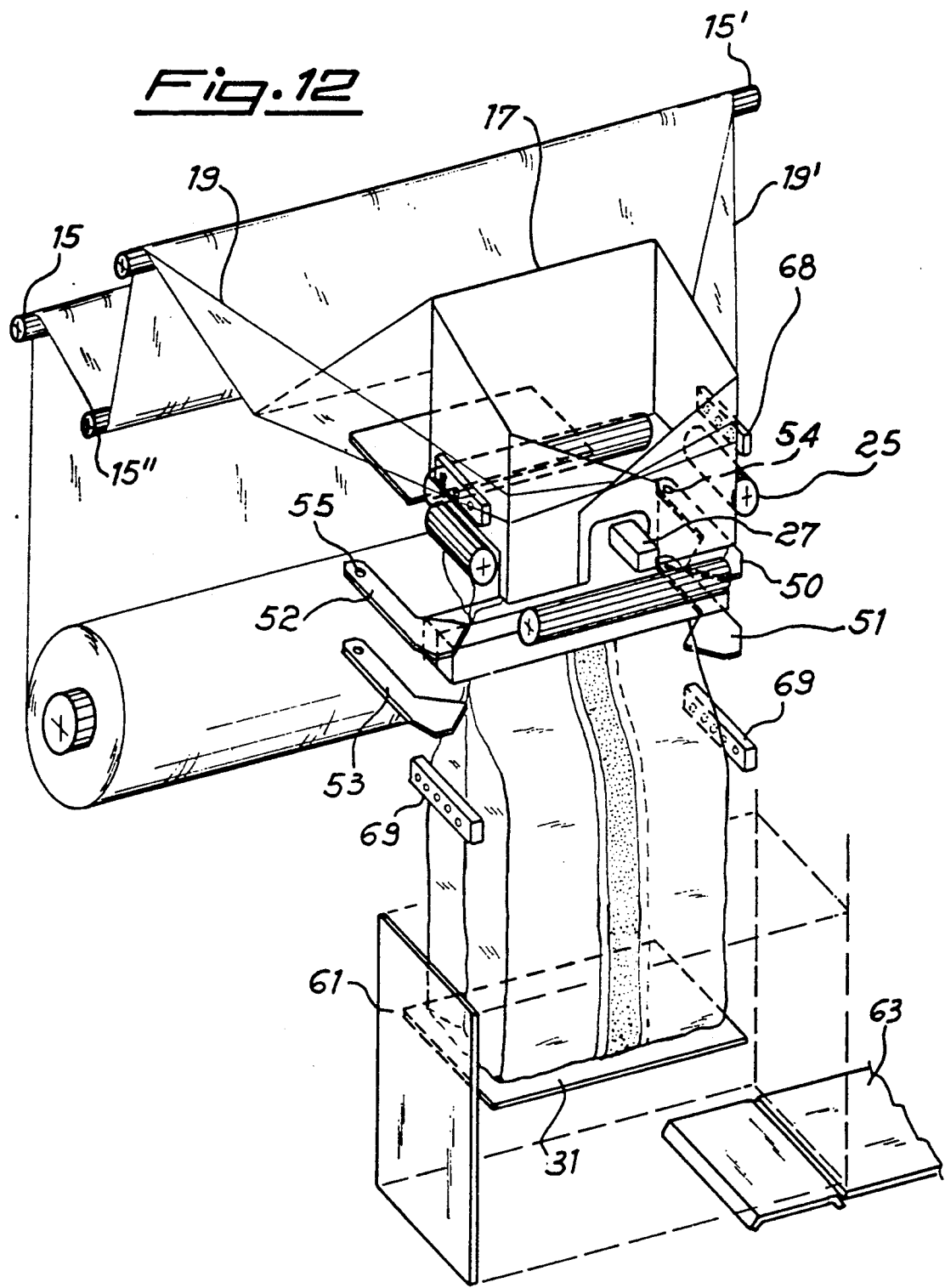
Figure 1B:
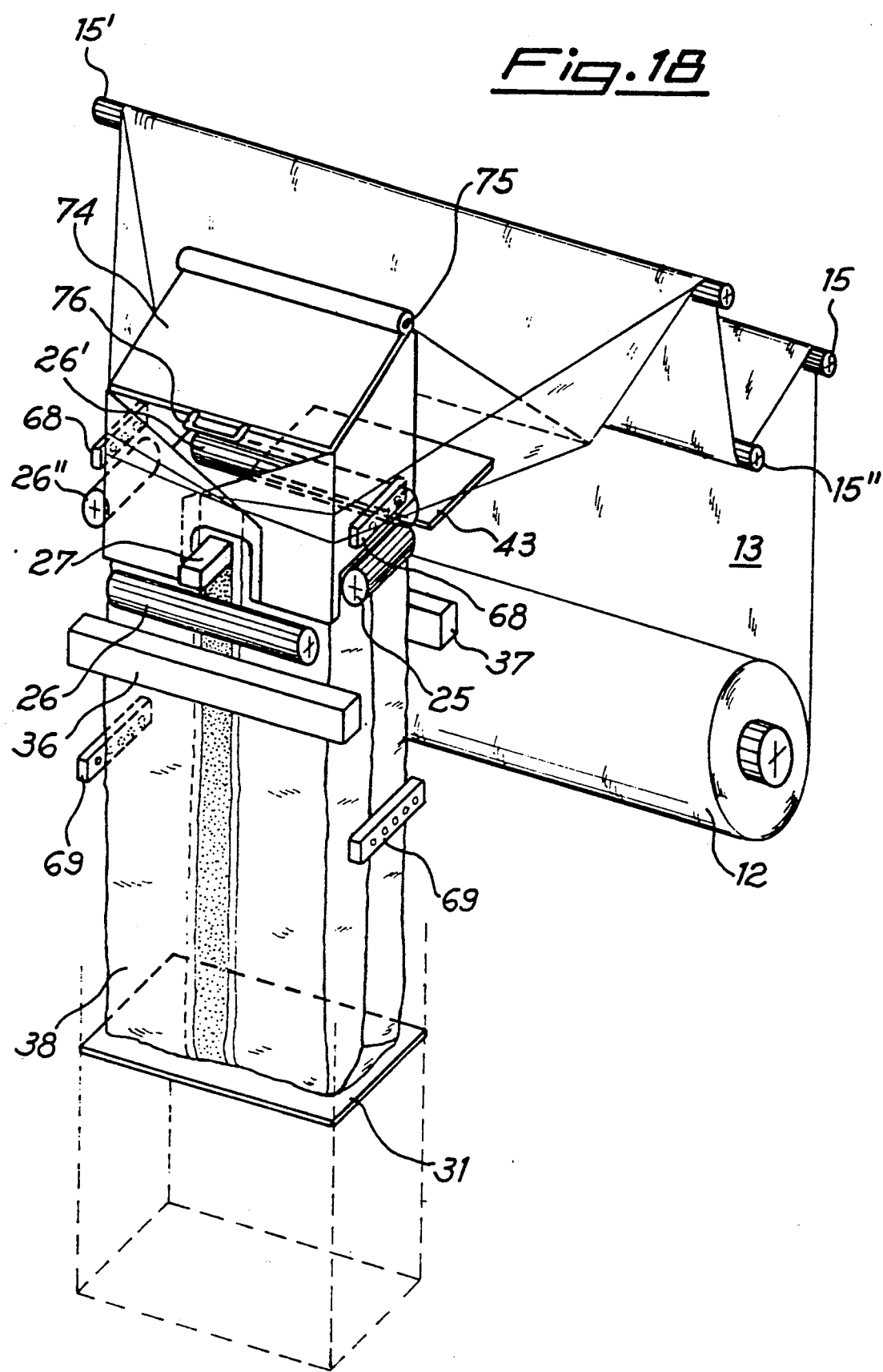

The closure or sealing of the bag 30 is carried out when loading platform 31 has completed its descent to that point at which the topmost goods packed in the bag have passed below and thereby reilluminated lower sensor arrays 69. The bag sealing and separating operation, which is depicted in FIGS. 12 and 13, is initiated by such reaction, e.g. reillumination, of lower arrays 69 as the articles contained within the full bag 38 descend below and clear the lower arrays. Reciprocating elements 36, 37 are then relatively moved into heat sealing engagement with the opposed faces of the full bag 38 which as seen in FIG. 7, is sealed closed by welding plate 40. At the same time, welding plate 39 creates the bottom-defining closure seal of the new bag 30 above full bag 38 and blade 42 cuts the film between the two seals thereby detaching the full bag 30 from the new bag 30 being formed (FIG. 12).

Concurrent with the approach of reciprocating elements 36, 37, the opposed pairs of folders 50, 52 and 51, 53 are pivoted into respective engagement with the opposed sides of the new bag 30 being formed and the full bag 38 about to have its upper edge heat sealed closed. Engagement of the folders with the bags 30, 38 creates longitudinal pleats or gussets along the sides of each bag as best seen in FIG. 12.

Referring now to FIG. 13, following simultaneous heat sealing closure of the full bag 38 and creation of the bottom of new bag 30, and the cutting of film 20 therebetween by cutting edge 42 (FIG. 8) to separate the two bags 38 and 30, the reciprocating elements 36, 37 separate slightly so as to free the now-closed top edge of the full bag 38. At this time rotation is once again imparted to lead screw 32 so that platform 31 resumes its descent until reaching its lowermost position which is coplanar with ejection platform 63, and, if employed, with adjacent fixed planar surface 62.

The reciprocated separation of the heat sealing elements 36, 37, in addition to freeing the top edge of now completed bag 38, also releases the newly-formed bottom seal of the new bag 30 on continuous tubular wrapper 20. As the elements 36, 37 begin to separate, temporary support platform 43 begins its lateral translation from the position shown in FIG. 12 to that illustrated in FIG. 13 above reciprocating elements 36, 37 and immediately below the no heat sealed and closed bottom of the new bag 30 being formed. The bottom of this new bag 30 may thus rest and be supported on platform 43 so that the placement of goods in the new bag may begin immediately—i.e. before ascending return of loading platform 31 and completion of the previous operation cycle relating to now-filled and sealed bag 38.

When both loading platform 31 and ejection platform 63 are in their lowermost positions and at the same level, motor 57 is operated to move pusher 61 rightward from its FIG. 13 position and thereby shift completed bag 38 from loading platform 31, and onto ejection platform 63 (FIG. 14) over fixed support 62 if employed. Ejection platform 63 then commences to ascend and travels to its uppermost position shown in FIG. 15, carrying with it the completed bag 38 to a height such that at least a portion of the bag 38 projects outwardly through and above discharge opening 7 in counter 1. In this position the bag 38 may be comfortably and conveniently removed by the customer.

Concurrent with the ascending travel of ejection platform 63, lead screw 32 is rotated to raise and return loading platform 31 to its initial position (FIG. 9) immediately under and supporting the new bag 30 being packed with goods. Platform 31 thereby takes the place of support platform 43 which has been moved laterally and thereby returned to its initial position (FIG. 15).

It should be noted that during the ascending return movement of loading platform 31 from its fully lowered (FIG. 13) to its fully raised (FIG. 15) position, gusset formers or folders 50, 51, 52, 53 are in their open or outwardly rotated condition and reciprocating elements 36, 37 are likewise fully separated. Also as loading platform 31 ascends, pusher 61 is returned to its initial position (FIG. 13) in preparation for the bag filling, sealing, and discharge phases of the next operation cycle of the bag forming apparatus.

The embodiment of the bag forming apparatus of the invention thus far disclosed additionally preferentially incorporates, both structurally and in its operation, several means for assuring both the safety of the operator and the continued integrity of various operating portions of the machine. For example, a sensor, which may be implemented utilizing conventional photoelectric devices, may be provided just below the top edge and within discharge opening 7 for detecting whether a sealed and completed bag 38 carried through opening 7 by ejection platform 63 has been removed therefrom by the customer. In the event that the bag has not yet been removed at that point in the operating cycle of the apparatus at which descent of ejection platform 63 would otherwise begin, an acoustic and/or visual signal may be generated to alert the operator and customer that the full bag must be removed, and descent of the ejection platform is prevented until removal of the bag from within discharge opening 7 has been effected.

Sensor arrays 68, 69 are also preferably employed in carrying out safety-related aspects in the operation of the bag forming apparatus of the invention. It is, for example, desirable to prevent injury to an operator and/or customer should an individual's hand or other object be inserted into counter opening 6 during operative motion of such elements as the reciprocating elements 36, 37 and the support platform 43. Toward this end, all the reciprocating motion of heat sealing elements 36, 37 and the lateral translation of support platform 43 are preferably immediately disabled when the sensors of top array 68 are blocked by an object placed therebetween through opening 6. When elements 36, 37 or platform 43 are already in motion when an object is detected between arrays 68, such motion may be simply discontinued or the direction of movement thereof may be automatically reversed to further minimize the risk of personal injury.

The sensor arrays 68, 69 are also used to prevent possible damage to the reciprocating elements 36, 37 should these elements be moved together into heat sealing relation with the film while one or more articles are disposed between them. Although the normal operation of the apparatus—in that the approach of the elements 36, 37 takes place only after the lower arrays 69 detect that the topmost goods packed in the bag 30 have cleared and descended below them—generally suffices to insure that no articles remain between the elements, there are unusual circumstances in which such a determination may not necessarily be dispositive. Where, for example, the elongated neck of a water bottle (through which the infra-red sensor rays may pass) projects above the topmost other goods in the bag 30, the output of the lower arrays 69 may be falsely interpreted to indicate that all articles in the bag have descended therebelow although, in fact, the neck of the water bottle projects upwardly beyond the lower sensors and into the path of the approaching heat sealing elements 36, 37. In order to avoid such an occurrence, an independent confirmation that all of the goods have indeed passed below lower arrays 69 may be required before enabling heat sealing approach of reciprocating supports 36, 37.

If employed, as shown and preferred, such independent confirmation may take a variety of forms. In the presently disclosed embodiment of the invention, this feature is implemented by comparing the position of loading platform 31 at two instances—first, when the upper sensor arrays 68 detect passage of the topmost articles packed in the bag 30, and second, when the lower sensor arrays 69 detect passage therebelow of the topmost articles packed in the bag. Only when the difference in those two sensed positions of loading platform 31 is at least as great as the known distance between the upper and lower arrays 68, 69 will reciprocating elements 36, 37 be operated to move them into heat sealing relation with the tubular film wrapper 20. Where on the other hand the difference in the sensed positions of platform 31 as the topmost articles in bag 30 pass each of the upper and lower sensor arrays 68, 69, respectively, is less than the known fixed distance between the upper and lower arrays, platform 31 is lowered by an additional distance corresponding to that difference before reciprocating elements 36, 37 are permitted to begin their film sealing approach.

Thus, in the above-mentioned example wherein a water bottle neck protrudes above the topmost other goods in the bag 30 and lower sensor arrays 69 produce an incorrect determination of the maximum height of the goods in the bag, upper sensor arrays 68 will nonetheless properly register the top cap of the bottle (which obscures the infra-red rays of the top sensors) as the water bottle cap passes and descends below upper arrays 68. Thus, although it appears to lower arrays 69 that all of the articles in bag 30 have cleared the lower arrays even though the neck of the water bottle has not, the reciprocating elements 36, 37 are prevented from moving into heat sealing relation with the film until loading platform 31 descends by an additional amount sufficient to move the entire water bottle below sensors 69. As previously described, sensing of the position of loading platform 31 may be carried out in a variety of ways including, for example, the combination of disc 116 on threaded bar 32 and cooperative sensor 117 (FIG. 3).

As previously indicated, the bag forming apparatus of the invention may be implemented in a number of alternative embodiments each particularly suitable for specific applications or environments. For example, one such modification renders the apparatus especially suitable for operation by even the most inexperienced users—such as the customers themselves—through the provision of additional safety-related elements and features.

Thus, the check-out counter of FIG. 2 differs from that illustrated in FIG. 1 primarily, but not exclusively, by the inclusion of a cover 74 movably closing the opening 6 and the omission of discharge opening 7 in the top surface of the counter. Cover 74, which is movable about securement hinges 75 and is graspable at its handle 76 (FIG. 16), is operatively coupled with various elements of the bag making apparatus incorporated within the check-out counter as will now become evident with reference to FIGS. 16 to 21. It should in any event be understood that, except as otherwise noted or required by the following description, the structural and functional characteristics and operating features of the inventive bag forming apparatus are substantially identical to that previously described with respect to the initially disclosed embodiment of the invention.

Referring first to FIG. 16, at the beginning of an operation cycle loading platform 31 is disposed below upper arrays 68 and at a predetermined distance from counter opening 6 as, for example, a distance of approximately 22 cm. With cover 74 in its open position, the bag 30 being formed rests at its bottom atop platform 31 and may be filled with articles 5, 5' through the opening 6 in counter 1. As goods are inserted into bag 30, the upper arrays 68 are obscured by the passage of goods thereby and, as the arrays are repeatedly obscured, threaded bar is rotated to slowly lower loading platform 31 from its initial position. In this manner, as articles continue to be introduced into bag 30, the longitudinal dimension of the bag slowly and continuously increases to accommodate the goods so packed (FIG. 17).

Upon termination or interruption of the loading of articles into bag 30, upper arrays 68 are no longer obscured by the passage of articles and the continued descent of loading platform 31 is stopped. If, on the other hand, articles continue to be loaded into bag 30, platform 31 will eventually descend to a predetermined minimum level selected to correspond to the maximum height of a bag formable by the apparatus.

When all articles to be packed have been placed into the bag 30 or, in the alternative, when the bag has been filled to its maximum capacity and platform 31 has descended to the aforementioned minimum level, cover 74 is manually pivoted about hinges 75 to close the counter opening 6. In the event that an excessive quantity of goods has been introduced into the bag 30 so that cover 74 is unable to be pivoted into full closure of opening 6, the customer or operator must remove the excessive articles until cover 74 may be fully closed over opening 6. Preferably, a safety device—as for example a conventional electromagnet (not shown)—then automatically locks cover 74 in its closed position so that the customer or operator no longer has access to opening 6 until the cover is subsequently released for the initiation of a new operation cycle of the apparatus.

With the cover 74 closed and locked, loading platform 31 once more continues its descent until lower sensor arrays 69 detect that all goods packed in bag 30 have moved below and cleared the lower arrays. At that point, depicted in FIG. 18, downward motion of loading platform 31 is again halted and bag 38 is in position for heat sealed closure of its top and separation from continuous tubular film wrapper 20 thereabove.

Figure 19:
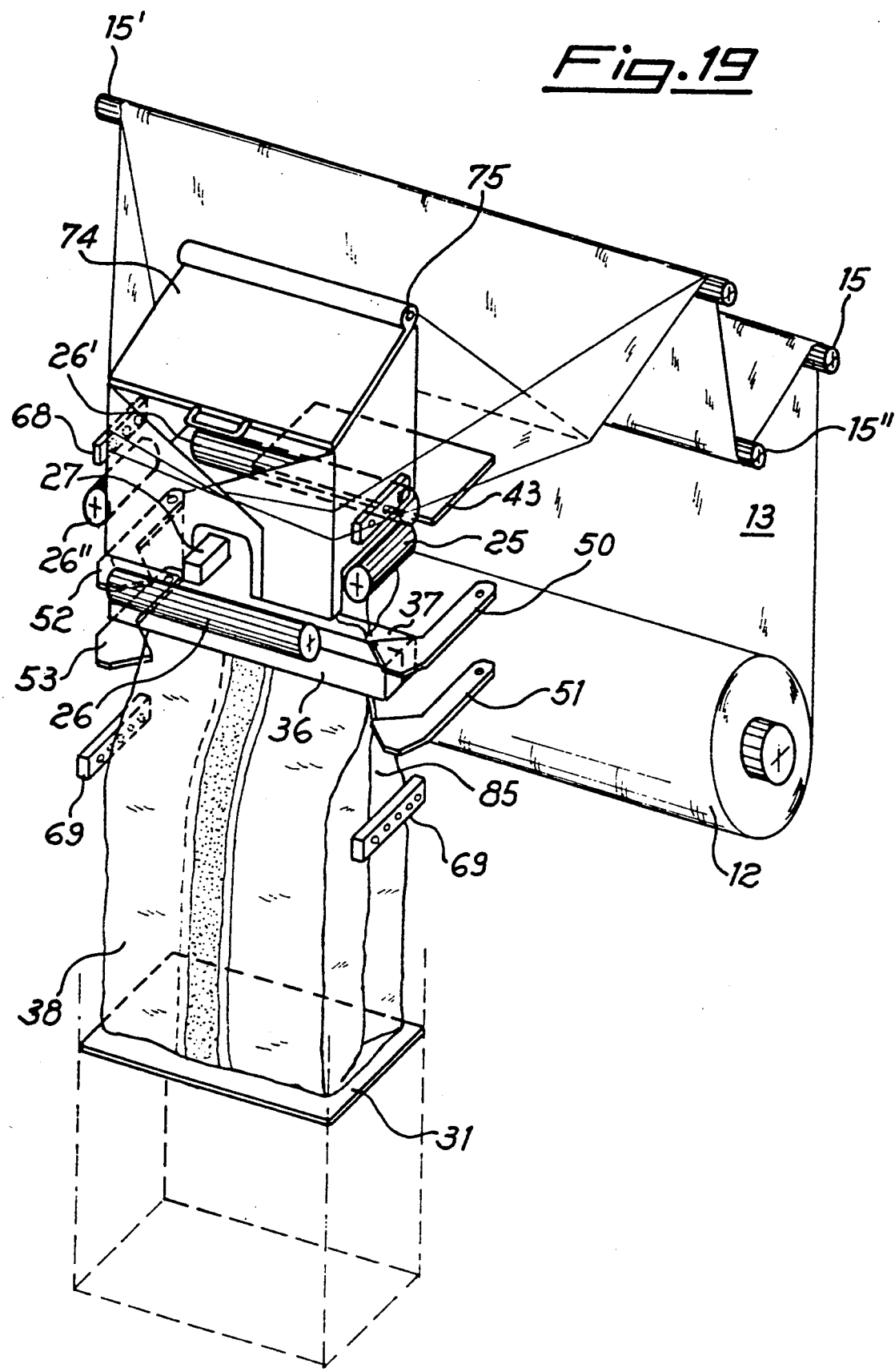
Figure 20:
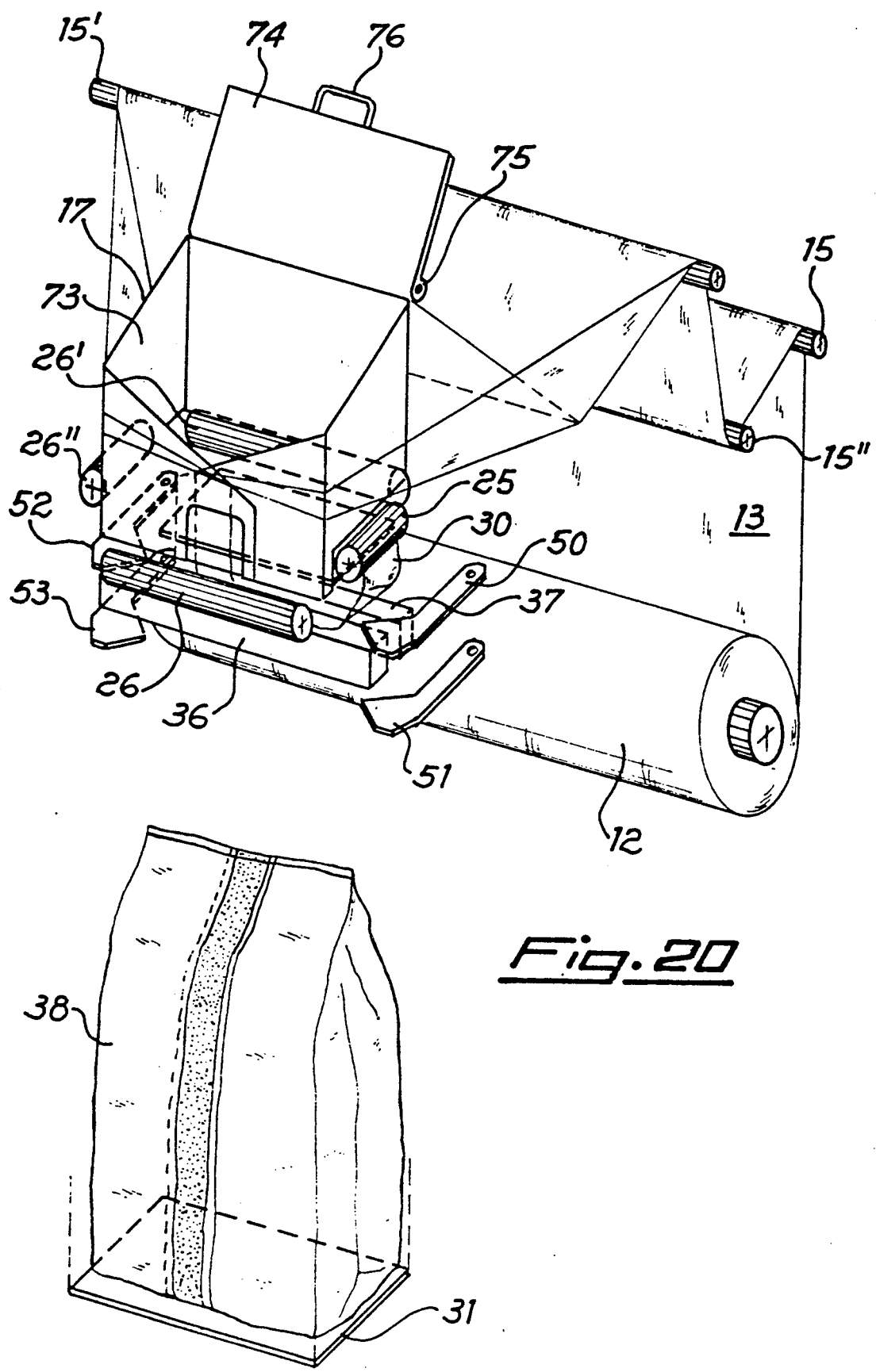

Referring now to FIG. 19, concurrent with the clearance of lower arrays 69 and the termination of downward movement of loading platform 31, reciprocating heat sealing elements 36, 37 are moved relatively together into heat sealing relation with the tubular wrapper of film therebetween. With the approach of elements 36, 37 and their engagement with the film, the top of the full bag 38 is sealed closed, the bottom of the new bag 30 in formation extending upwardly from heat sealing elements 36, 37 is created, and the transverse cut detaching the full bag 38 from the continuous tubular wrapper 20 is performed as previously described in connection with FIGS. 7 and 8. As full bag 38 is now closed at both its top and bottom ends it is ready for discharge from the apparatus and, to this end, platform 31 is further lowered to its lowermost position (FIG. 20).

Completed bag 38 may be discharged or ejected from the apparatus in any of a number of ways. For example, with platform 31 in its lowermost (FIG. 20) position, a motor actuated linkage T may be actuated so that platform 31 is tipped (FIG. 21). Thus bag 38 moves under the force of gravity against and/or through an opening (not shown) in a side or end wall of the check-out counter from which it can be readily picked up and removed by the customer. In another form of the invention, the completed bag 38 may be discharged through a lateral opening aligned with and at the end of the path traversed by the pusher 61 in the first described embodiment of the invention. In that instance, vertically reciprocated ejection platform 63 may be eliminated and replaced with a single continuous planar surface extending between platform 31 in its fully lowered position and a lateral wall opening 78 (shown in broken lines in FIG. 13). In another form of full bag ejection means, the planar surface extending between platform 31 and opening 78, along which bag 38 is advanced by pusher 61, is upwardly inclined toward the opening so that the bag is discharged from the apparatus at a height conveniently accessible to the customer for removal of the discharged bag. Of course, other bag ejection means and arrangements are also within the scope and contemplation of the invention.

Following ejection of the full bag 38 from the apparatus, loading platform 31 reascends to its uppermost position and there takes the place of support platform 43 which is concurrently returned to its laterally removed position, all as depicted in FIG. 16. As in the first described embodiment of the bag forming apparatus, support platform 43 is transversely moved from its laterally removed to its more central position for supporting the new bag 30 being formed following creation of the bottom seal on new bag 30 and detachment therefrom of the full and sealed bag 38. In this manner, as previously described, articles may be introduced into new bag 30 even before completion of the prior operation cycle of the apparatus. Thus, as soon as the bottom of new bag 30 is supported by platform 43, cover 74 is automatically released and may be opened by the customer or operator to enable the insertion of articles through opening 6 and into the new bag.

Figure 25:
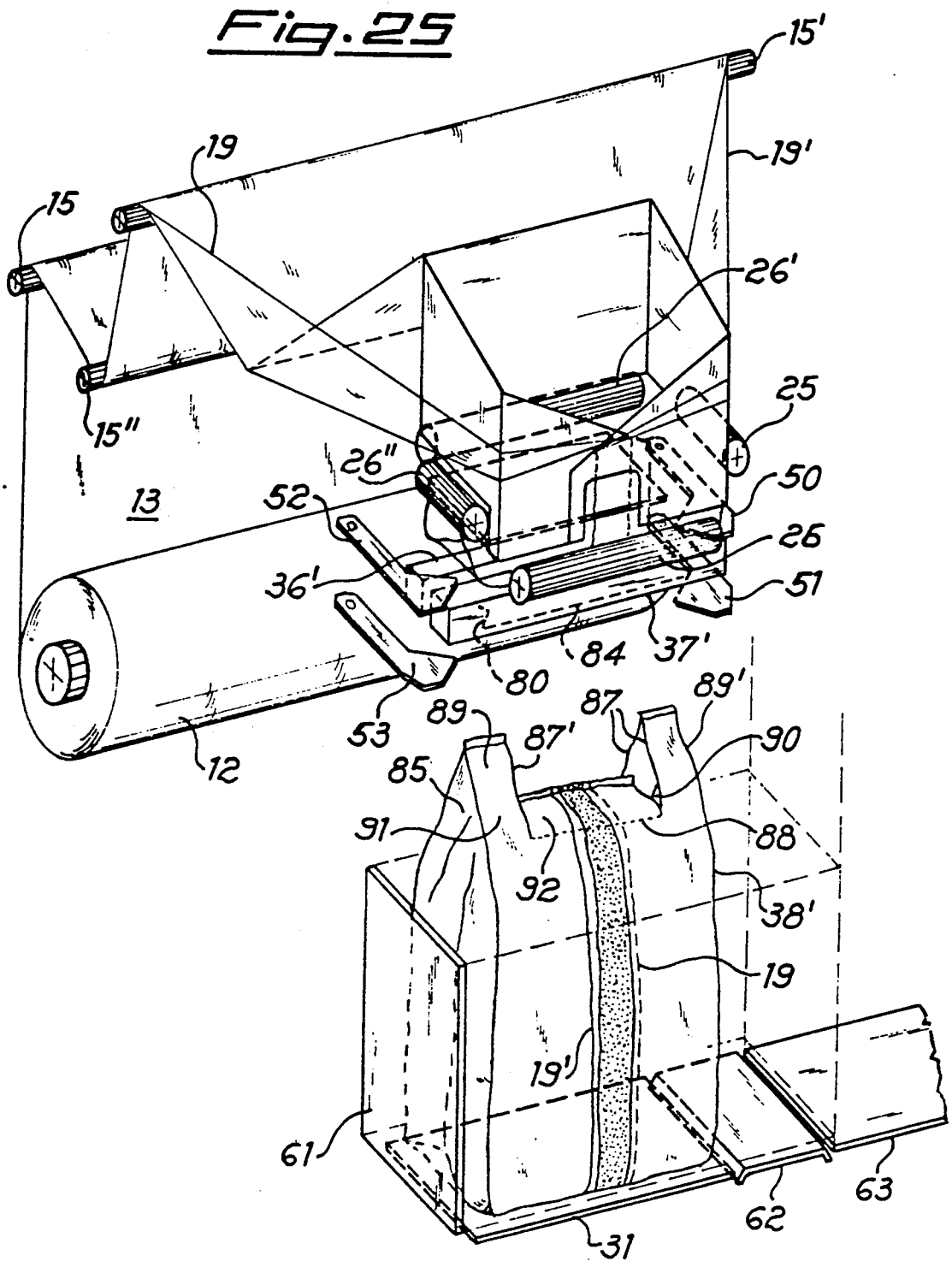

Another aspect of the present invention lies in the bags formed or formable by the apparatus, whereby the structure of the fully sealed and closed article-containing bags may integrally and unitarily incorporate handles to facilitate their transport. As shown in FIG. 25, the improved bag 38' of the invention is heat sealed closed along its top edge and includes longitudinal cuts 87, 87' transverse to the top closing seal and defining handles 89, 89' inwardly spaced from and adjoining the sides of the bag. Additionally, a perforation 88 is also preferably defined in each of the front and rear faces of the bag 38' between and bridging handles 89, 89'. These perforations 88, as will hereinafter become clear, facilitate subsequent opening of the sealed bag 38' for permitting access to and removal of its contents, and also reliably enable reuse of the bag after its original contents have been emptied therefrom. Indeed, even with a sealed bag without handles, the inclusion of perforations for facilitating the opening of the bags at home may be desirably and may be included in the bag formation.

Figure 22:
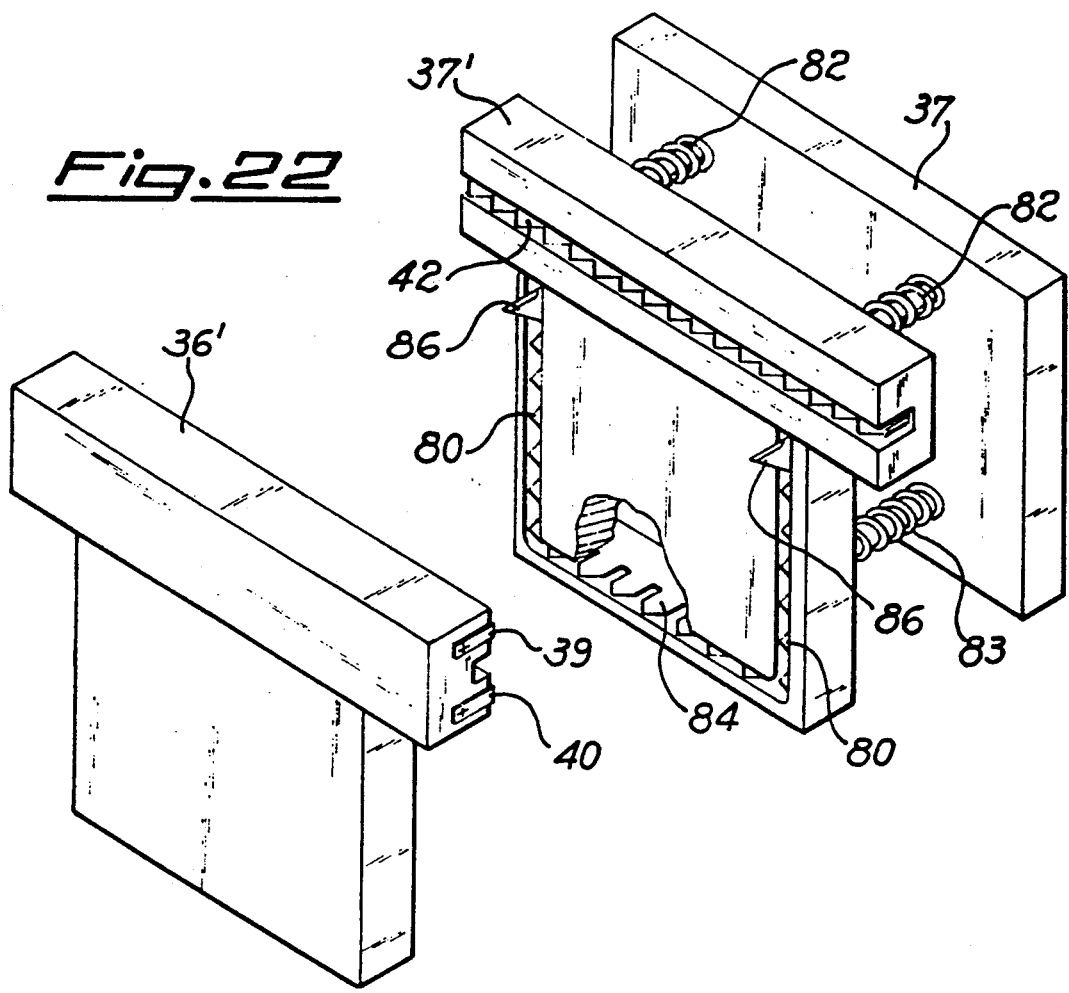
FIG. 22 is a perspective view partly in elevation, and partly in section, of still another embodiment of the invention comprising means for forming a bag with handles.
Figure 23:
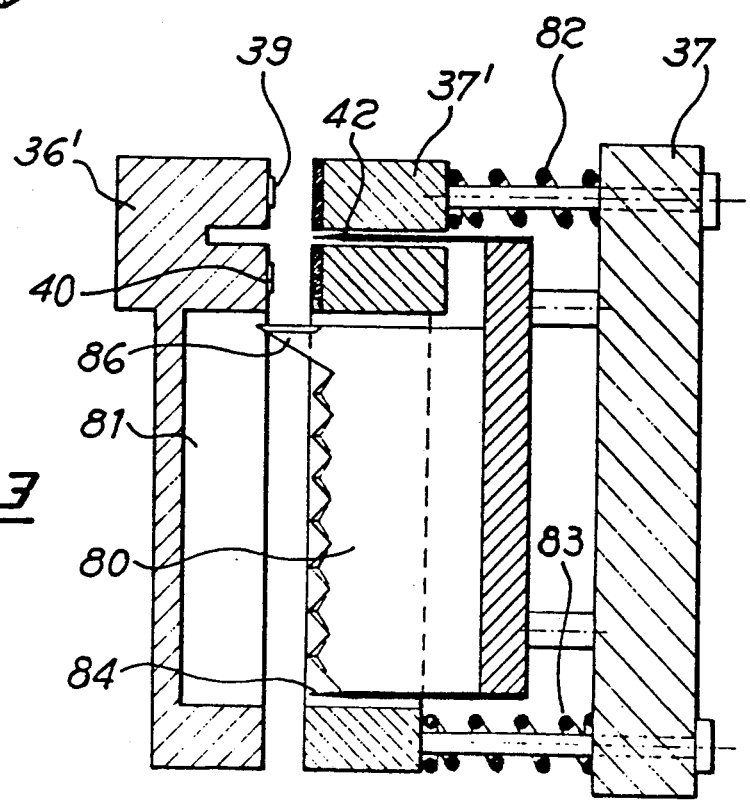
FIG. 23 is an enlarged sectional view of the handle forming means shown in FIG. 22.

The improved bag 38' is formable by the apparatus of the invention utilizing modified reciprocating elements 36', 37' which are illustrated in FIGS. 22 and 23. As there shown, reciprocating element 37' carries, in addition to the transverse blade 42 heretofore described, two longitudinally-oriented (e.g. vertical) elongated blades 80, preferably although not necessarily serrated or jagged, located so as to be below the lower heat seal 40 of reciprocating element 36' when the elements 36', 37' are moved into heat sealing engagement with the interposed tubular film wrapper 20. Element 36' correspondingly carries two blade receiving spaces or grooves 81, only one of which is visible in FIG. 23. Two pair of compression springs 82, 83 urge reciprocating element 37' against element 36' during the heat sealing and cutting of the film.

The two longitudinal blades 80 are joined together at their lower ends by a substantially horizontal perforating die or blade 84. The blades 80 are positioned so that, as reciprocating elements 36', 37' are moved together about the tubular film wrapper of bag 38', they contact the bag just interior or clear of the lateral extent of the gussets 8 formed by the free ends of folders 51, 53 on each side of the full bag 38'. Thus, as the compression springs 82, 83 press the reciprocating elements 36', 37' against the interposed tubular film wrapper 20, the blades 80 are driven through the front and rear faces of bag 38' and, consequently, through two layers of film 13 to thus sever said layers along the two lines defined by blades 80.

It is also within the contemplation of the invention that the blades 80 be positioned instead so that they contact the face of bag 38' with the lateral extent of the gussets 85. In this alternate case, approach and engagement of reciprocating elements 36', 37' about the interposed film wrapper 20 drives each of the blades 80 through one of the gusseted portions of bag 38' and, consequently, through four layers of film 13 to form a strip or bridge of film between the bag handles and the overlying protective envelope. This results, as will become evident, in a closed bag structure from which the chance of inadvertent spillage of the bag's contents is substantially minimized.

Each of the longitudinal blades 80 is also preferably provided with a projecting portion 86 which extends outwardly from element 37' by a distance sufficient so that, when reciprocating elements 36', 37' initially separate following heat sealing contact with the film, the projecting portions 86 continue to bridge the gap between the slightly separated elements 36', 37' as shown in FIG. 23. The purpose of projections 86 will become apparent hereinafter.

Figure 24:
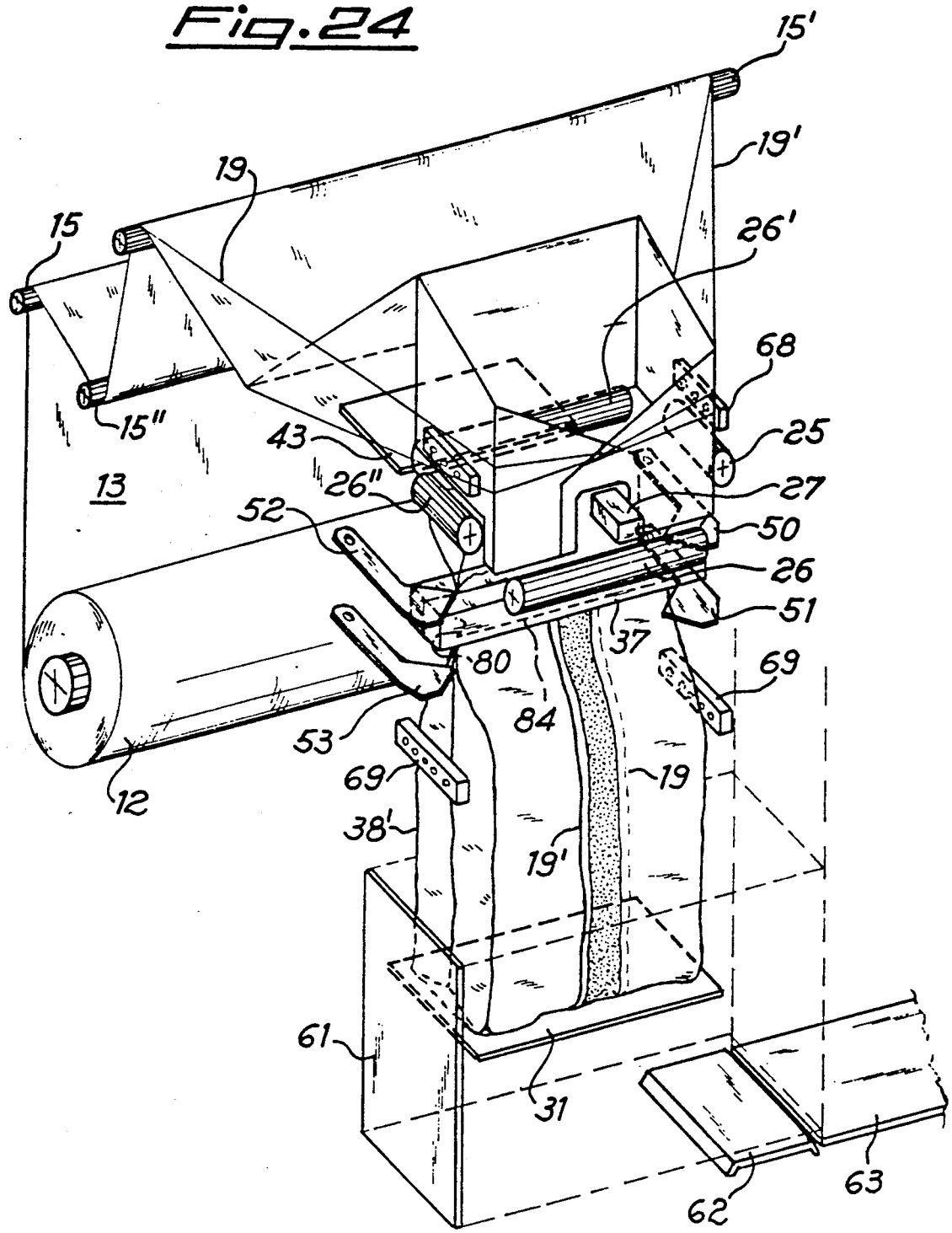
FIGS. 24 and 25 are perspective views in elevation of a portion of the apparatus of the invention at different times during the formation of bags with handles.

Formation of the improved handled bag 38' may best be understood by reference to FIGS. 24 and 25. As previously described in connection with other embodiments and aspects of the invention, as reciprocating elements 36', 37' are moved together toward and into engagement with the interposed tubular film wrapper 20, inward rotation of folders 50, 52 and 51, 53 create the pleats or gussets 85 in the new bag 30 and the filled bag 38', respectively. Upon contact of elements 36', 37' with the interposed film, the heat sealing plates 39, 40 on element 36' form the heat sealed bottom closure of the new bag 30 and top closure of filled bag 38, respectively, and blade 42 produces a transverse cut through the tubular wrapper between the two heat seals so as to separate the completed bag 38 from the bag 30 in formation which is still part of the continuous tubular film wrapper 20 thereabove. In addition, in the present modified form of the invention the elongated blades 80 create longitudinal (e.g. vertical) cuts 87, 87' inwardly spaced from the gusseted sides of the bag and perforating die 84 produces a line of punched slits or perforations 88 through the front and rear faces of the bag film.

Following heat sealing and blade cutting contact of reciprocating elements 36', 37' with the interposed bag film the supports separate slightly and platform 31 resumes its downward motion to carry the completed bag 38' to a position for subsequent ejection or discharge from the apparatus. As bag 38' moves downward with the descending platform 31, the projecting portions 86 of the blades 80 continue to cut the film of the full bag 38 longitudinally through the top heat seal closure of the bag. These additional cuts through the top closing seal of the bag, in conjunction with the longitudinal cuts 87, 87' produced by the blades 80, define and complete the handles 89, 89' along opposite sides of the filled and completed bag 38'.

It should be especially pointed out and understood that the top of the bag 38', between the longitudinal handle-defining cuts 87, 87', remains integral with the bag and, by reason of the top closing heat seal therebetween, forms an envelope 92 which is effective to prevent accidental loss or outpouring of the goods contained in the bag 38' during the subsequent transport thereof. This protective envelope 92 may nevertheless be readily removed to open the bag and permit access to the goods contained therewithin for emptying the bag at the convenience of the user. Removal of the protective envelope 92 is rendered advantageously more convenient and facile by inclusion of the perforation 88 produced by perforating die 84 which is preferred. When included, the protective envelope is separable along perforated line 88 from the remainder of bag 38'. Once the envelope 92 has been thus removed and the bag 38' emptied of its contents the bag may be readily reused for the receipt and/or transport of other articles.

Figure 26:
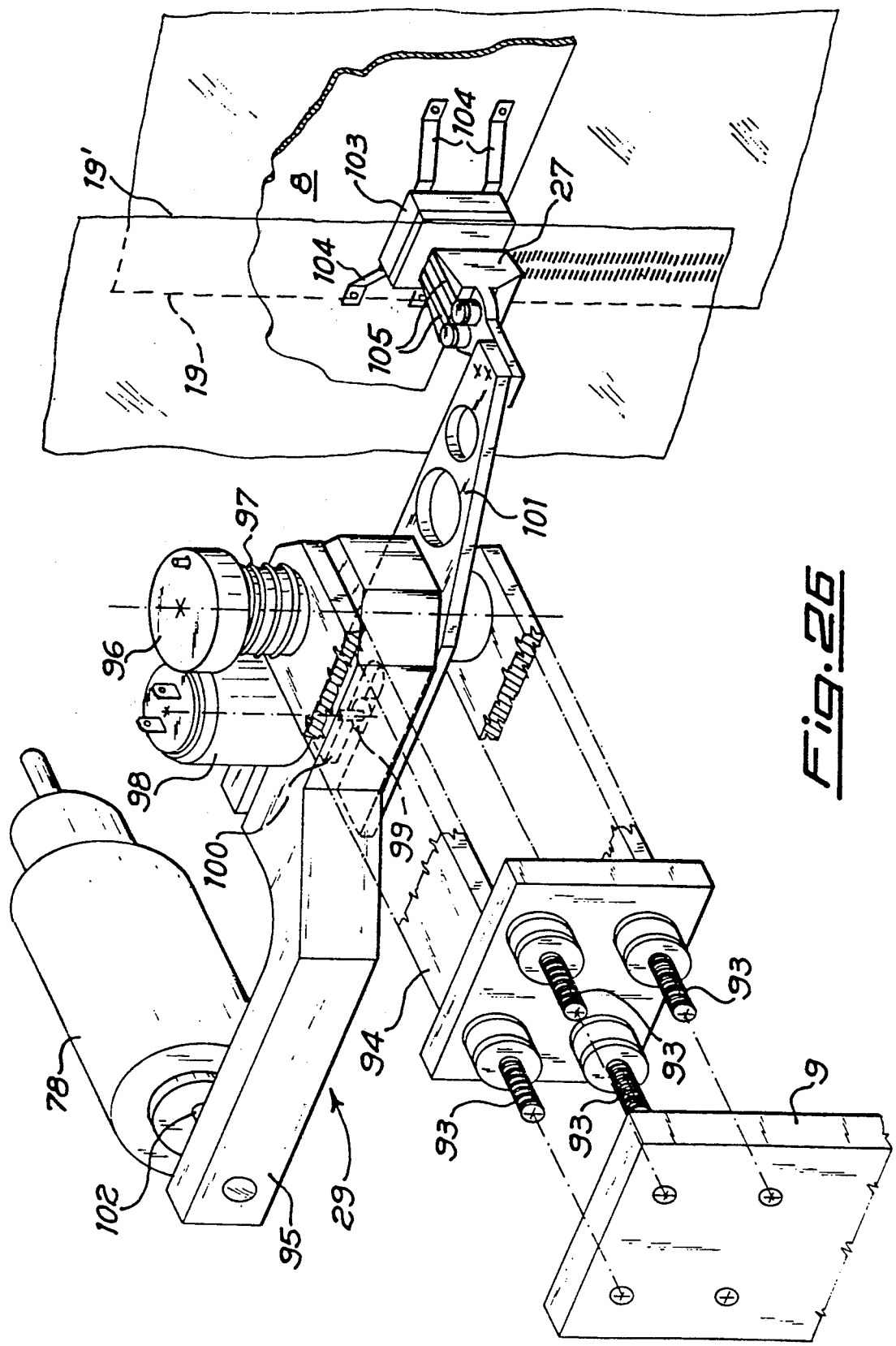
FIG. 26 is a perspective elevational view of the longitudinal heat sealing apparatus suitable for use as part of the invention; and, FIG. 27 is a perspective elevational sectional view of a sealing head used in the heat sealing apparatus shown in FIG. 26.

The details of the preferred form of welding device 29 (FIG. 3) for heat sealing the overlapped edges 19, 19' of the film 3 as the film is formed into a tubular wrapper 20 within the interior of former 17 is illustrated in FIGS. 26 and 27. The heat sealing unit 29 is supported by a bracket 94 which is joined by a plurality of threaded connectors 93 to a plate 9 which preferably comprises a portion of the frame of the bag forming apparatus. As shown and preferred, connectors 93 have vibration damping grommets or rubber rings or the like mounted thereon in order to minimize mechanical disturbance to the remainder of the apparatus. The heat sealing or welding head 27 is carried on one end of a rocker arm 101 which is mounted for pivotal movement about a vertical shaft 96 and in which a groove 100 is defined at its end opposite head 27. A lever 95 mounted at one of its ends for pivotal movement about shaft 96 is connected at its opposite end to the shaft 102 of an electromagnet 28, preferably rigidly joined to the frame of the machine. A return torsion spring 97 disposed about shaft 96 between the shaft head and lever 95 urges the lever clockwise into contact with the end of the electromagnet shaft 102. The shaft of an electric motor 98 fixed to and mounted on lever 95 carries a cam 99 disposed in the groove 100 of rocker arm 101.

When the electromagnet 28 is actuated, lever 95 and, through its cammed connection, rocker arm 101, are driven through a partial counterclockwise rotation about shaft 96 against the urging of torsion spring 97. As rocker arm 101 so rotates, it carries welding head 27 toward the superposed edges 19, 19' of the film 13.

When on the other hand electromagnet 28 is not actuated, return spring 97 places a clockwise urgency on lever 95 and rocker arm 101 to carry and maintain welding head 27 out of contact with the superimposed edges of the film. This inactive or non-heat sealing position of the welding head permits facilitated manual feeding of film 13 into the interior of former 17 to be readily carried out when, for example, it is necessary to replace an exhausted film roll 12 supported on rollers 14, 14'.

When electromagnet 28 is actuated the heat sealing unit 29 is moved into working position in which welding head 27 approaches the superposed film edges 19, 19'. The edges 19, 19' are in contact with a plate 103 resiliently mounted on and supported from the surface of collar 8 by leaf springs 104. As the tube-formed film 13 is drawn downwardly within former 17, its superposed edges 19, 19' are pressed between welding head 27 and plate 103 by a reciprocated or hammering movement of the welding head against the film edges. This hammering action of head 27 on plate 103 is effected by the operation of motor 98 which, through rotation of motor-driven cam 99 in groove 100, causes high frequency oscillation (as for example at 50 to 80 Hertz) of rocker arm 101 about shaft 96. In an alternative arrangement, the combination of motor 98, cam 99 and rocker arm groove 100 may be replaced with a repeatedly and alternately activated and deactivated electromagnet suitably acting on rocker arm 101.

With particular reference to FIG. 27, welding head 27 includes a pair of electrical strap resistors 105, 105' in series connection through a U-connector 106 and in electrical communication with a power source (not shown) at terminals 107, 107' through a cable 108. Insulated pushers or tensioners 109, 109' which are mounted on and urged upwardly by compression springs 110, 110' compensate for terminal expansion and assure that proper tensioning of the strap resistors is continuously achieved. The strap resistors overlay spacers 111, 112 which insulate the resistors from the metal casing of the welding head 27.

Heat is supplied to the overlayed edge portions of film 13 to be joined by conduction through the flattened front surfaces 113, 113' of strap resistors 105, 105'. As is well known, proper performance of the heat sealing operation requires close or narrow control of the heat sealing temperatures of resistors 105, 105'; such control can be effected in any known manner as, for example, with an electronic control system which monitors the temperature value of the resistors by monitoring their resistance at terminals 107, 107'. The monitored resistance is compared with a predetermined reference resistance value corresponding to the desired sealing temperature and the electronic control system operates to maintain the difference between the measured resistance and the reference value within an acceptable range by controlling the electric power supplied to the strap resistors.

From the foregoing it should be apparent that the preferred method of joining the superposed edges 19, 19' of tubular film wrapper 20 to form a continuous longitudinal seal along the film tube is effected by the combination of two simultaneous actions having thermal and mechanical characteristics. The first action is the localized softening of the film which is caused by heat supplied through strap resistors 105, 105'; the second action is the high frequency hammering of the softened area of the film as the welding 27 is repeatedly driven against plate 103 with the superposed film edges 19, 19' interposed therebetween. The intermittency of the hammering action also allows and enables a smooth longitudinal flow of the continuous tube-formed film under and past the welding head 27.

An additional modification of the process and apparatus of the invention is also contemplated to prevent or reduce pilferage. This optional feature compares the weight of articles packed in the bags custom-formed by the inventive bag forming machine is correlated against the total actual weight of the goods for which the customer has paid. If the weight of the bagged merchandise is more than the weight of the articles for which the customer has been charged, there has been either honest errors by cashiers or pilferage by cashiers and customers. The contemplated method involves four distinct steps and, in conjunction with the improved check-out counter and bag forming apparatus of the invention, may be readily implemented by the use of known and conventionally available means.

The first step of this method is the placement on the packaging of articles to be sold of a scannable bar code or other indicia indicating the weight of the packaged article. As bar codes uniquely identifying an article are today imprinted on the packaging of the great majority of consumer goods, the addition of weight-related information to the presently-employed bar codes, or the addition of a supplemental bar code or like indicia to the packaging is clearly within the ability of those skilled in the art.

The second step of the method is the automatic or semi-automatic scanning or reading of the weight-related bar code or otherwise implemented indicia information from the article or its packaging. This second method step may be carried out by a hand-held scanning wand or light pen or by a counter-mounted rotating scanner or the like, all as conventionally known. Thus, the scanner, in reading each article's bar code and thereby uniquely identifying that item, will in accordance with this method concurrently or serially scan and decode the weight-related information borne by the article or its packaging.

It should at this point be noted that, as an alternative to directly marking encoded weight-related indicia or information on the article or its packaging, the weight of the article may instead be stored in the scanner mechanism's memory in look-up table form, in much the same manner in which the price of an item scanned is stored in the scanner's memory rather than being imprinted directly on the article or its packaging. In either instance, upon completion of the scanning of all articles purchased and to be packed in bag formed by the apparatus of the invention the scanner or, more likely the control device operating the scanner, has directly read or otherwise determined the weight of each of the individual articles purchased and, has preferably added together all of those weights, and thus obtained a sum total for the weight of all of the goods purchased.

The third method step comprises obtaining an independent total of the weights of each of the bags formed by the apparatus and in which the goods have been packed. The weight of each bag may be readily determined as, for example, in conjunction with weight sensor plate 118 (FIG. 3) which is carried on loading platform 31 between the platform and the goods-receiving bag. Where the articles are packed in a plurality of such bags, the total weight may be obtained automatically—as for example by sensing and retaining in a temporary additive memory the weight of each bag in succession immediately prior to its ejection from the apparatus—or manually as desired.

The fourth and final method step is comparing the total weight of the articles scanned and the total weight of the bags in which the articles have been packed. In the event that those weights do not substantially coincide, especially if the weight of the bagged merchandise weighs more than the total weight of the merchandise for which the customer has been charged, corrective action of an appropriate nature may be carried out and, if desired, a hard copy record of the discrepancy may be printed and retained by well know means for subsequent action and review.

Thus, the various embodiments of processes, apparatus and articles hereinabove described in accordance with the invention provide for the automated packaging of widely varied volumes of goods in custom-sized bags, manufactured on-site and on-demand in accordance with the volume of goods to be packed. Each bag may have a height continuously or step-wise variable between a minimum and a maximum—as for example between about 10 to 15 cm and about 50 cm—depending upon the particular installation and selectable design criteria at the option of the user.

While there have been shown and described numerous novel features of the invention as applied to several preferred and/or illustrative embodiments thereof, it will be understood that various omissions and substitutions and changes in the form and details of the devices illustrated and in their operation and in the methods and processes described, may be made by those skilled in the art without the departing from the spirit of the invention. Indeed, since there are so many novel features, many may be omitted if desired with departing from the invention, and the described structure is generally preferred but not required, modifications being possible without departing from this invention. It is the intention, therefore, that this invention be limited only as indicated by the scope of the claims appended hereto.

What is claimed is:

1. A method for in-situ manufacturing of flexible bags at a check-out counter and for the packing of articles within the bags being formed at the counter, comprising the steps of:

bringing the lateral edges of a longitudinally continuous sheet of flexible, substantially nonstretchable material into joinable relationship with one another in association with a hollow former and joining the lateral edges of the film to produce a longitudinally continuous tubular wrapper;

transversely sealing the tubular wrapper to form a closed bottom of a bag being formed;

placing articles to be packed into the bag being formed through the interior of the hollow former;

longitudinally advancing the tubular wrapper to accommodate the articles being packed int eh bag being formed;

transversely cutting the tubular wrapper to detach the bag being formed from the longitudinally continuous wrapper at a point beyond the articles packed in the bag being formed and thereby forming the top of the bag;

transversely sealing the tubular wrapper at said bag-detaching transverse cut to close the top of the bag for preventing unintended loss of packed articles from within the bag; and longitudinally cutting the tubular wrapper from said bag detaching transverse cut to a point intermediate the top and bottom transverse seals to provide a pair of handles unitarily on said bag and a protective envelope closing the bag between said handles for preventing the unintended loss of articles from within the bag.

2. A method in accordance with claim 1, further comprising transversely perforating the tubular wrapper between said handles for facilitating subsequent opening of the protective envelope and access to the articles packed within the bag.

3. A method in accordance with claim 1 wherein the hollow former includes an opening through which articles are inserted into the interior of the former and the bag being formed, said joining of the lateral edges of the film being performed at a position downstream of the article-receiving opening in the former.

4. In a check-out counter at which articles purchased by a customer are packed in bags for transport therefrom by the customer, the improvement comprising apparatus for on demand manufacturing at the check-out counter of custom-sized article packed bags substantially conforming in size to the volume of articles packed therein, comprising:

means for longitudinally feeding a longitudinally extending tubular wrapper formed of flexible, substantially nonstretchable film material;

first means for transversely sealing the film at a first location along the tubular wrapper to create a closed bottom of a bag being formed for the receipt of articles to be packed therein, the top of said bag in formation remaining open for the receipt of said articles;

means for transversely cutting the film at a second location along the tubular wrapper above said transverse seal to define the ultimate top of the bag after the bag has received a volume of articles and to separate the articles-containing bag from the longitudinally continuous tubular wrapper;

means for selecting said second location including means for determining the volume of articles received in the bag being formed and for longitudinally advancing the tubular wrapper by an amount sufficient to place said second location along the tubular wrapper at a line defining a length of wrapper sufficient to accommodate said volume of articles;

second means for transversely sealing the film adjacent the vicinity of said second location to close the top of the bag for preventing the unintended loss of packed articles from within the bag; and means for forming a pair of spaced apart handles unitarily with the tubular wrapper at the top of said bag and for defining a protective envelope intermediate said handles to facilitate retention of articles packed in the bag.

5. In a check-out counter in accordance with claim 4, further comprising means for perforating the tubular wrapper in the area of said protective envelope for facilitating the opening of said envelope to gain access to the articles packed in said bag.

6. In a check-out counter in accordance with claim 4, said volume determining and tubular wrapper advancing means further comprising sensor means for detecting the uppermost level of received articles most remote from the bottom of the bag being formed and means for advancing the tubular wrapper to define the top of the bag at a predetermined distance along said tubular wrapper beyond the determined uppermost level of goods.

7. In a check-out counter in accordance with claim 4, further comprising means for supplying substantially flat film material having longitudinal edges, and means for forming the continuous flat film material into said tubular wrapper.

8. In a check-out counter in accordance with claim 7, said tubular wrapper forming means comprising a substantially hollow former, and means for directing said flat film material into the interior of said hollow former to shape said flat material as a tubular wrapper with said longitudinal edges in sealable relation, and means for sealingly joining said longitudinal edges to form said tubular wrapper.

9. In a check-out counter in accordance with claim 8, wherein said edges are in sealable relation by virtue of marginal longitudinal edge portions of said flat film being in overlapping relation, and wherein said means for sealingly joining said edges joins said edges by joining said marginal edge portions in said overlapping relation.

10. In a check-out counter in accordance with claim 9, said tubular wrapper advancing means comprising a platform for supporting the bottom of the bag being formed during the packing of articles therein and means for substantially vertically moving said platform to selectively advance the bag being formed on the tubular wrapper.

11. In a check-out counter in accordance with claim 9, further comprising an opening defined in the check-out counter top and aligned with said substantially hollow former and through which articles to be packed are inserted into the interior of the former for receipt within the bag being formed.

12. In a check-out counter in accordance with claim 4, further comprising means for discharging a completed bag from the check-out counter for removal therefrom.

13. In a check-out counter at which articles purchased by a customer are packed in bags for transport therefrom by the customer, the improvement comprising apparatus for on demand manufacturing at the check-out counter of custom-sized article packed bags substantially conforming in size to the volume of articles packed therein, comprising:

means for longitudinally feeding a longitudinally extending tubular wrapper formed of flexible, substantially nonstretchable film material;

first means for transversely sealing the film at a first location along the tubular wrapper to create a closed bottom of a bag being formed for the receipt of articles to be packed therein, the top of said bag in formation remaining open for the receipt of said articles;

means for transversely cutting the film at a second location along the tubular wrapper above said transverse seal to define the ultimate top of the bag after the bag has received a volume of articles and to separate the articles-containing bag from the longitudinally continuous tubular wrapper;

means for selecting said second location including means for determining the volume of articles received in the bag being formed and for longitudinally advancing the tubular wrapper by an amount sufficient to place said second location along the tubular wrapper at a line defining a length of wrapper sufficient to accommodate said volume of articles; and means for continuously sensing the weight of the articles in the bag being formed.

14. A method for on demand formation of flexible bags at a check-out counter and for the packing of articles within the bags being formed at the counter, comprising the steps of:

longitudinally feeding a longitudinally extending tubular wrapper made of flexible, substantially nonstretchable material;

transversely sealing the tubular wrapper at a first location longitudinally along the wrapper to create a closed bottom of the bag being formed;

placing articles to be packed into the tubular wrapper;

longitudinally advancing the tubular wrapper to move a portion of the wrapper beyond the articles packed in eh bag being formed to a position for detaching the bag being formed from the remainder of said longitudinally extending wrapper;

transversely cutting the tubular wrapper at said position beyond the articles packed int h bag being formed to detach the bag being formed from the longitudinally continuous wrapper and to thereby define the top of the bag at said transverse cut;

transversely sealing the top of the bag being formed at said transverse cut to close the bag and prevent the unintended loss of packed articles from within the bag; and longitudinally slitting the tubular wrapper from and through said transverse seal at the top of the bag to a point intermediate the top and bottom of the bag to provide a pair of unitary handles on said bag and a protective envelope closing the bag between said handles for preventing the unintended loss of packed articles from within the bag.

15. A method in accordance with claim 14, further comprising transversely perforating the tubular wrapper between said handles to facilitate subsequent opening of the protective envelope for access to the articles packed within the bag.

16. A method in accordance with claim 14, wherein said transverse cutting of the tubular wrapper is performed at a predetermined distance longitudinally beyond the upper most level of packed articles in the bag being formed, said wrapper advancing step further comprising sensing the uppermost level of goods packed in the bag being formed and longitudinally advancing the wrapper for performing said transverse bag detaching cut at the predetermined distance longitudinally beyond the uppermost level of goods in the bag being formed, so that the size of the manufactured bag variably depends on and substantially conforms to the volume of articles packed in the bag.

17. A method in accordance with claim 14, wherein said film feeding step comprises feeding the flexible film material into the hollow means so that opposed longitudinal edges of the film are brought into sealable relation within the hollow means, and longitudinally sealing together said edges of the film to form the longitudinally continuous tubular wrapper.

18. A method in accordance with claim 17, wherein said edges are brought into sealable relation by overlapping the marginal edge portions of said film material into overlapping relation, and said edges are sealed together by sealing together said marginal edge portions.

19. A method of forming a flexible bag containing therein one or more articles, from a flexible collapsible longitudinally extending tubular wrapper which when collapsed in the transverse direction includes front and back panels defined by longitudinally extending edges, comprising the steps of:
    forming a first transverse seal between said longitudinal edges for joining said front and back panels to form a closed bottom of the bag;
    placing one or more articles to be contained within the bag into the tubular wrapper;
    forming a second transverse seal between said longitudinal edges along a line above said first seal for joining said front and back panels to form a closed top of the bag; and
    cutting the tubular wrapper to form a pair of longitudinal slits through said front and back panels from and through said second seal to a point intermediate said first and second seals to thereby define a pair of handles for facilitating transport of the bag, the portion of said second seal between the handles forming a protective envelope for preventing unintended loss of the one or more articles from within the bag.

20. A method of forming a bag in accordance with claim 19, further comprising the step of defining a perforation through at least one of said front and back panels and between said longitudinal slits for facilitating opening of the bag by at least partial detachment of the wrapper at said perforation.

21. A method of forming a bag in accordance with claim 20, further comprising the step of forming a pair of inwardly folded gussets connecting said front and back panels at their respective longitudinal edges.

22. A method of forming a bag in accordance with claim 21, wherein said tubular wrapper is formed from a longitudinally continuous sheet of said flexible material having longitudinal edges by the step of sealing the longitudinal edges of said sheet to one another.

23. A method of forming a bag in accordance with claim 22, wherein the step of sealing said longitudinal sheet edges to one another comprises the step of folding said sheet longitudinally whereby to bring marginal longitudinal edge portions of said sheet into overlapping relation, and then sealing said overlapping marginal edge portions to one another.

24. A method of forming a bag in accordance with claim 23, wherein said flexible material is sealable by the application of heat thereto and at least one of said sealing steps is performed by heating the material in the area to be sealed.

25. A method of forming a bag in accordance with claim 20, wherein said tubular wrapper is formed from a longitudinally continuous sheet of said flexible material having longitudinal edges by the step of sealing the longitudinal edges of said sheet to one another.

26. A method of forming a bag in accordance with claim 25, wherein the step of sealing said longitudinal sheet edges to one another comprises the step of folding said sheet longitudinally whereby to bring marginal longitudinal edge portions of said sheet into overlapping relation, and then sealing said overlapping marginal edge portions to one another.

27. A method of forming a bag in accordance with claim 20, wherein said flexible material is sealable by the application of heat thereto and at least one of said sealing steps is performed by heating the material in the area to be sealed.

28. A method of forming a bag in accordance with claim 25, wherein said flexible material is sealable by the application of heat thereto and at least one of said sealing steps if performed by heating the material in the area to be sealed.

29. A method of forming a bag in accordance with claim 21, wherein said flexible material is sealable by the application of heat thereto and at least one of said sealing steps is performed by heating the material in the area to be sealed.

30. A method of forming a bag in accordance with claim 19, further comprising the step of forming a pair of inwardly folded gussets connecting said front and back panels at their respective longitudinal edges.

31. A method of forming a bag in accordance with claim 19, wherein said tubular wrapper is formed from a longitudinally continuous sheet of said flexible material having longitudinal edges by the step of sealing the longitudinal edges of said sheet to one another.

32. A method of forming a bag in accordance with claim 31, wherein the step of sealing said longitudinal sheet edges to one another comprises the step of folding said sheet longitudinally whereby to bring marginal longitudinal edge portions of said sheet into overlapping relation, and then sealing said overlapping marginal edge portions to one another.

33. A method of forming a bag in accordance with claim 32, further comprising the step of forming a pair of inwardly folded gussets connecting said front and back panels at their respective longitudinal edges.

34. A method of forming a bag in accordance with claim 31, further comprising the step of forming a pair of inwardly folded gussets connecting said front and back panels at their respective longitudinal edges.

35. A method of forming a bag in accordance with claim 34, wherein said flexible material is sealable by the application of heat thereto and at least one of said sealing steps is performed by heating the material in the area to be sealed.

36. A method of forming a bag in accordance with claim 19, wherein said flexible material is sealable by the application of heat thereto and at least one of said sealing steps is performed by heating the material in the area to be sealed.

37. A method of forming a bag in accordance with claim 36, wherein said tubular wrapper is formed from a longitudinally continuous sheet of said flexible material having longitudinal edges by the step of sealing the longitudinal edges of said sheet to one another.

38. A method of forming a bag in accordance with claim 37, wherein the step of sealing said longitudinal sheet edges to one another comprises the step of folding said sheet longitudinally whereby to bring marginal longitudinal edge portions of said sheet into overlapping relation, and then sealing said overlapping marginal edge portions to one another.

39. A method of forming a bag in accordance with claim 19, further comprising the steps of forming the tubular wrapper from a single longitudinally continuous sheet of flexible material by directing the sheet into the interior of a substantially hollow former such that marginal longitudinal edge portions of the sheet material are placed in overlapping relation, and sealing said overlapped marginal edge portions of the sheet material to form the tubular wrapper.

* * * * *